(12) United States Patent
Subramanian et al.

(10) Patent No.: US 7,584,418 B2
(45) Date of Patent: Sep. 1, 2009

(54) METHODS, SYSTEMS, AND ARTICLES OF MANUFACTURE FOR PREFABRICATING AN INFORMATION PAGE

(75) Inventors: Sowmya Subramanian, Palo Alto, CA (US); Ramu Sunkara, Los Altos, CA (US); Kunal Kapur, San Carlos, CA (US); Anthony Lai, Cupertino, CA (US); Sarim Siddiqui, Fremont, CA (US); Sunny Wong, San Mateo, CA (US); Hyun-Sik Byun, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 09/872,589

(22) Filed: May 31, 2001

(65) Prior Publication Data
US 2002/0194211 A1 Dec. 19, 2002

(51) Int. Cl.
*G06N 3/00* (2006.01)
(52) U.S. Cl. .................................................. 715/234
(58) Field of Classification Search ................ 715/530, 715/907, 517, 513, 500, 523, 234, 243, 254, 715/255
See application file for complete search history.

(56) References Cited

U.S. PATENT DOCUMENTS

| | | | |
|---|---|---|---|
| 5,727,220 A | * | 3/1998 | Hohensee et al. ........... 715/513 |
| 5,758,072 A | * | 5/1998 | Filepp et al. ................ 709/220 |
| 5,765,205 A | * | 6/1998 | Breslau et al. .............. 711/203 |
| 5,797,128 A | * | 8/1998 | Birnbaum ...................... 707/5 |
| 5,951,694 A | | 9/1999 | Choquier et al. |
| 6,038,574 A | | 3/2000 | Pitkow et al. |
| 6,092,196 A | * | 7/2000 | Reiche ....................... 713/200 |
| 6,138,120 A | * | 10/2000 | Gongwer et al. ............. 707/10 |

(Continued)

FOREIGN PATENT DOCUMENTS

EP 0 847 020 A2 6/1998

(Continued)

OTHER PUBLICATIONS

Supplementary European Search Report from related European Patent Application EP 02 75 1998, mailed on Jul. 18, 2006.

(Continued)

*Primary Examiner*—Stephen S Hong
*Assistant Examiner*—Kyle Stork
(74) *Attorney, Agent, or Firm*—Vista IP Law Group, LLP.

(57) ABSTRACT

A system and method for prefabricating information pages is disclosed, in which the necessary steps to retrieve and package information requested by a user are preemptively performed by the computer system. When the user later makes an explicit request for information, the desired information can be immediately displayed to the user without the delays associated with contemporaneous retrieval and packaging of the information. The prefabrication system of the invention can be configured to automatically tune its processing to the changing conditions that exist in the computer system, which can be used to maximize use of available system resources. The present invention can be scalably deployed to perform coordinated prefabrication services on multiple, distributed computing nodes. In an embodiment, the invention is completely non-intrusive, in which no changes to existing application are required to implement prefabrication of pages.

92 Claims, 13 Drawing Sheets

U.S. PATENT DOCUMENTS

| | | | |
|---|---|---|---|
| 6,182,085 B1* | 1/2001 | Eichstaedt et al. | 707/104.1 |
| 6,182,095 B1 | 1/2001 | Leymaster et al. | |
| 6,182,122 B1* | 1/2001 | Berstis | 709/217 |
| 6,205,481 B1* | 3/2001 | Heddaya et al. | 709/226 |
| 6,253,208 B1* | 6/2001 | Wittgreffe et al. | 707/104.1 |
| 6,298,356 B1 | 10/2001 | Jawahar et al. | |
| 6,549,935 B1* | 4/2003 | Lapstun et al. | 709/204 |
| 6,629,132 B1* | 9/2003 | Ganguly et al. | 709/213 |
| 6,691,163 B1* | 2/2004 | Tufts | 709/224 |
| 6,742,033 B1* | 5/2004 | Smith et al. | 709/224 |
| 2002/0078165 A1* | 6/2002 | Genty et al. | 709/217 |
| 2002/0147887 A1* | 10/2002 | Copeland et al. | 711/118 |

FOREIGN PATENT DOCUMENTS

| | | |
|---|---|---|
| EP | 0 847 020 A3 | 4/1999 |
| WO | WO 00/22526 | 4/2000 |

OTHER PUBLICATIONS

Challenger, J. et al., "*A Scalable System for Consistently Caching Dynamic Web Data*"; INFOCOM '99. 18th Annual Joint Conference of the IEEE Computer and Communications Societies Proceedings. Mar. 21, 1999, pp. 294-303, vol. 1, IEEE, New York, NY, USA.

"*IBM Web Cache Manager: Isn't It Time You Gained Control Over Rising Internet Access Costs?*", IBM Web Cache Manager—Overview, http://www.storage.ibm.com/hardsoft/products/wcm/webcache/, Apr. 1998, pp. 1-5, IBM, Inc., San Jose, CA, USA.

International Search Report from International Application No. PCT/US02/16475, mailed on Sep. 30, 2002.

EP Office Action for European Patent Application No. 02751998.2, mailed Feb. 13, 2008.

EP Office Action for European Patent Application No. 02751998.2, mailed Oct. 30, 2006.

JP Office Action for Japanese Patent Application No. 500759/2003, mailed Jun. 3, 2008, and English translation of Office Action for Japanese Patent Application No. 500759/2003.

Japanese Patent Application Publication No. 2000-09001, dated Mar. 31, 2000, and English Translation of Abstract for Publication No. 2000-09001.

Japanese Patent Application Publication No. 11-194983, dated Jul. 21, 1999, and English Translation of Abstract for Publication No. 11-194983.

AU Office Action for Australian Patent Application No. 2002344294, mailed Mar. 21, 2007.

IN Office Action for Indian Patent Application No. 1531/KOLNP/2003, mailed Oct. 31, 2008.

IN Office Action for Indian Patent Application No. 1531/KOLNP/2003, mailed Aug. 18, 2008.

Shin Kurihara, Innovation in Mobile Contents Business, Mobile Media Magazine, vol. 6 No. 10, pp. 66-67.

* cited by examiner

| INDEX TABLE | DESCRIPTION |
|---|---|
| WEIGHT INDEX | INDEXES PRBS ACCORDING TO THEIR WEIGHTS |
| DEPTH INDEX | INDEXES PRBS ACCORDING TO THEIR DEPTHS |
| URI SUBSTRING INDEX | INDEXES PRBS ACCORDING TO THEIR URI SUBSTRINGS. NOW, THE URI SUBSTRING IS DEFINED AS THE .JSP NAME OF THE PRB (E.G. JTFAVALD.JSP). |
| ID INDEX | INDEXES PRBS ACCORDING TO THEIR APPID, RESPID, USERID COMBINATION. |
| URI INDEX | INDEXES PRBS ACCORDING TO THEIR URI. SINCE THIS ATTRIBUTE IS ALWAYS UNIQUE, THE DATA STRUCTURE OF THIS INDEX IS A SIMPLE HASHTABLE OF PRBS, INSTEAD OF A HASHTABLE OF VECTORS. |

*FIG. 10*

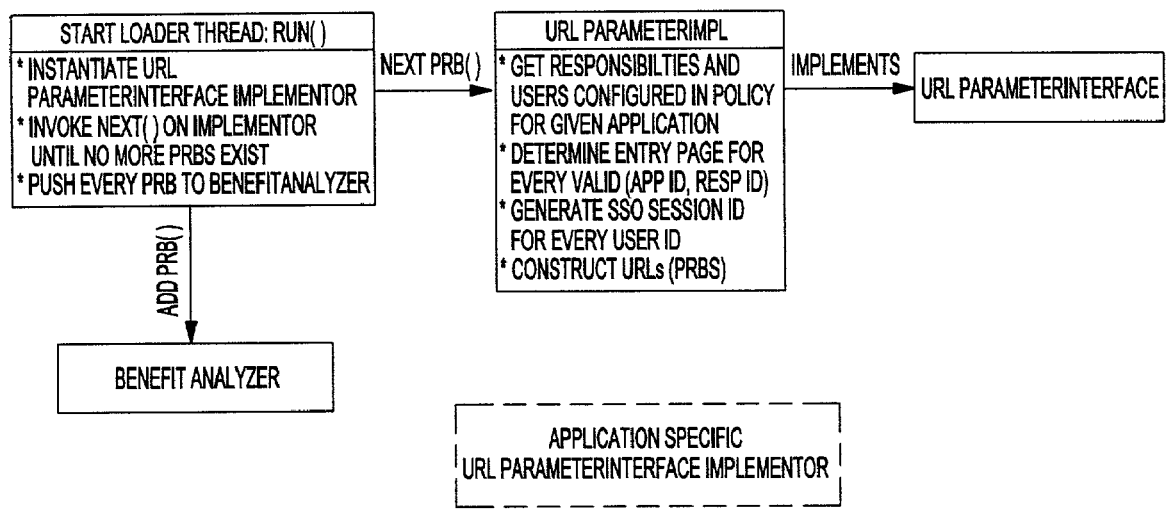

*FIG. 11*

METHODS, SYSTEMS, AND ARTICLES OF MANUFACTURE FOR PREFABRICATING AN INFORMATION PAGE

BACKGROUND AND SUMMARY

The present invention relates to the field of computer systems. More particularly, the invention relates to a method and system for prefabricating information in a computer system.

Many computer applications obtain and display information to users. For example, a web browser is a specially configured application for retrieving and displaying web pages. When the user of a web browser indicates a desire to view a particular page of information, the browser or its supporting hardware/software components on the user station performs actions to create and send an information request to the location of the information. The information request is sent across the network to the location of the information, is serviced at the remote location to create/send the requested information, which is then returned to the local user station for viewing. In a multi-tier architecture, the information request may be directed to a middle tier web server, which in turn handles the requesting, retrieval, and packaging of information from one or more back-end data servers. Such information retrieval and display actions are relevant to many networked computer applications, such as distributed database applications.

To illustrate, consider a typical user's home page that is established on a web portal site. A portion of the home page may be configured to display the latest prices for stocks owned by the user and a summary of the value of the user's stock portfolio. Other portions of the home page can be configured to display other types of information, such as news, weather, etc. When the user's browser requests the home page, a page request is sent to a web server having the responsibility for retrieving relevant items of information on the home page from one or more back-end data servers (e.g., stock price information from a database server), processing the data if necessary (e.g., to calculate stock portfolio values for the user), and packaging the page information into a designated page format for display.

In conventional computer systems, there is always an inherent delay associated with this process of "fabricating" a page of information. Each information request could involve multiple network roundtrips that consume a given quantity of time. Substantial delays may also occur because of large information items that must be retrieved or downloaded across the network. The information request may involve database processing at a back-end data server, causing more delays. In addition, once all the information is collected, it may have to be rendered or packaged into a specific format, causing yet more delays. These delays could significantly affect the performance or usability of a computer application. In modern business environments, such delays could contribute to unacceptable productivity losses for computer users.

Therefore, it is an object of the invention to provide a method and system for increasing response speeds and reducing response times to user requests for information.

The present invention provides a method and system for prefabricating information, in which the necessary steps to retrieve and package information requested by a user are preemptively performed by the computer system. When the user later makes an explicit request for information, the desired information can be immediately displayed to the user without the delays associated with contemporaneous retrieval and packaging of the information.

In one embodiment, the invention comprises a prefabricator that generates prefabrication requests. The prefabrication requests are processed to create and store prefabricated information. An interceptor receives information requests from users, and provides the prefabricated information in response to the information requests. The prefabrication components of the invention can be non-intrusively used with any existing computer application and without requiring installation of any additional hardware components.

The prefabrication system of the invention can be configured to automatically tune its processing to the changing conditions that exist in the computer system. This permits the prefabrication process to take full advantage of any excess resources available in the system during periods of low resource usage, by automatically increasing the prefabrication workload. During periods of high resource usage, the prefabrication workload is automatically lowered to minimize any harmful effects upon other run-time work being performed by the system.

The present invention can be scalably deployed to perform coordinated prefabrication services on multiple, distributed computing nodes. According to an embodiment of the invention in a multi-node environment, any number of prefabricator instances can be configured to perform prefabrication functions on separate network nodes. Each prefabricator instance handles its allocated portion of the prefabricated information, and stores the prefabricated information in a network accessible storage device. When a user makes an information request, any of the nodes within the prefabrication framework can determine if the requested information has been prefabricated, and retrieve the prefabricated information for the user. By intelligently distributing the workload across multiple nodes, the system resources in all prefabricator nodes can be optimally harnessed and dynamically tuned. Regardless of the quantity of prefabrication workload that is assigned to a given node, all nodes equally participate in the benefits of prefabricated information, since all prefabricated information, even information prefabricated by other nodes, are universally accessible from networked storage devices.

An embodiment of the invention provides a method to manage session security for prefabrication services. The interceptor in this embodiment is configured to verify the validity of session ID values for users. If the user makes an information request that can be satisfied with prefabricated information, then the interceptor provides the prefabricated information with the valid session ID for the user attached to the information.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 10 identifies example indexes to user page tables.

FIG. 11 shows a process flow for a start loader according to an embodiment of the invention.

DETAILED DESCRIPTION

The present invention takes the form of a method and system for prefabricating information, in which the necessary steps to retrieve and package information requested by a user are preemptively performed by the computer system—before the user makes an explicit information request. Instead, an embodiment of the invention predictively identifies and prefabricates information that may be displayed to the user in the future. When the user later makes a request for information, the desired information can be immediately displayed to the user without the delays associated with contemporaneous retrieval and packaging of the information. For the purposes of illustration, and not by way of limitation, the present explanation is made with respect to "pages" of information that are displayed to a user. It is noted, however, that other granularities of information may be prefabricated within the scope of the invention.

Figure 1:
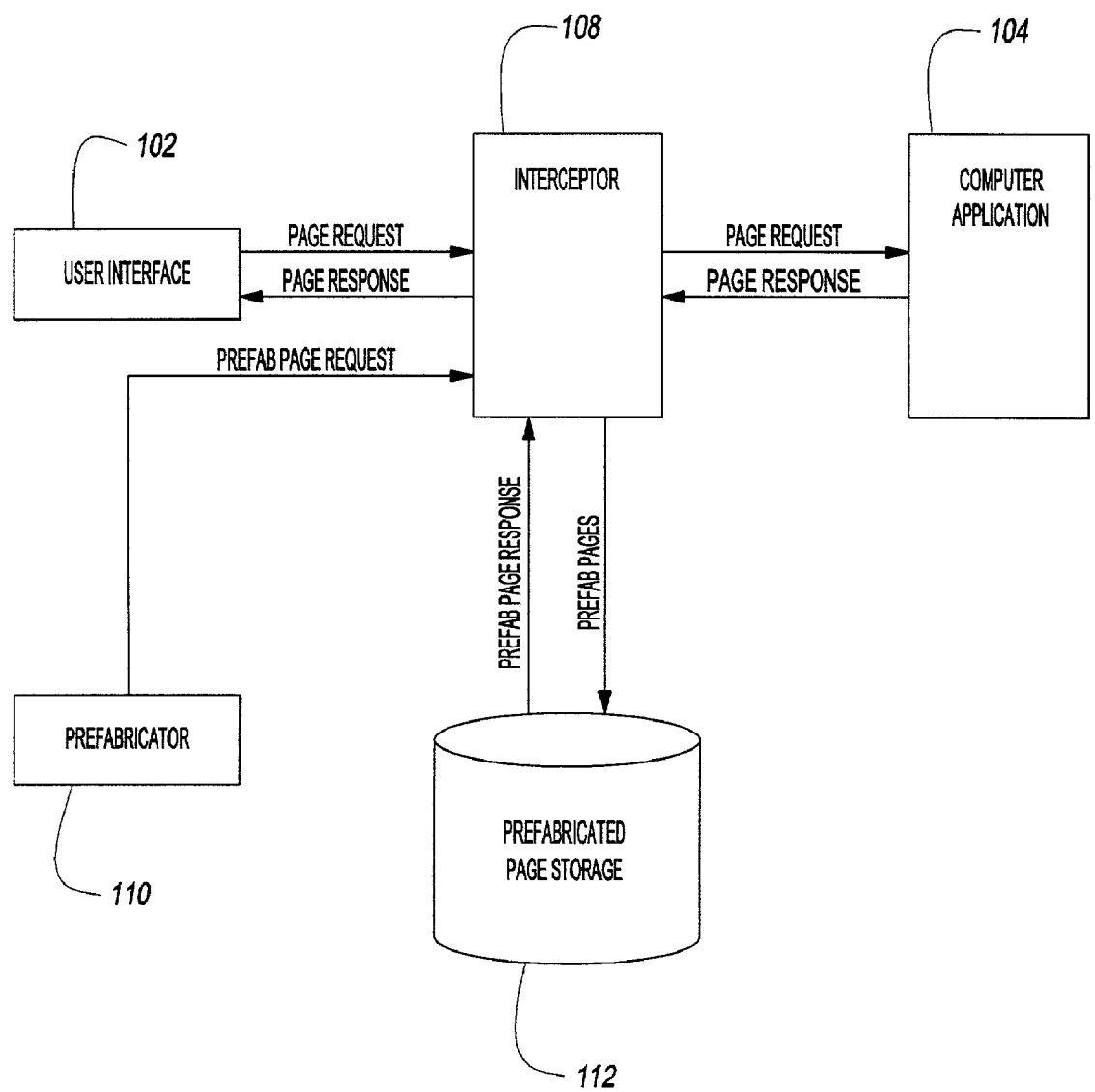
FIG. 1 depicts prefabrication components according to an embodiment of the invention.

According to an embodiment, a set of prefabrication system components is deployed to prefabricate pages for a computer application. Referring to FIG. 1, shown is a computer application 104 that generally produces or processes information for display to users. Computer application 104 could be any application that displays information to users, such as, for example, a database application. Information pages from the computer application 104 are displayed to users via a user interface 102, which may be, for example, a conventional web browser. User interface 102 responds to user commands to generate page requests for information pages requested by the user.

An interceptor 108 is logically interposed between the user interface 102 and the computer application 104. When a page request is sent from user interface 102 to computer application 104, the interceptor 108 intercepts the page request to determine if a valid, prefabricated page exists that is responsive to the request. This determination is made by identifying whether the requested page had already been prefabricated and cached/stored in a storage device 112. Storage device 112 could be any device usable to store an accessible copy of the prefabricated page, such as a memory cache, a local disk drive, or a network file system ("NFS") device.

If the requested page has already been prefabricated, then the page request is immediately fulfilled by retrieving the prefabricated page from the storage device 112 for display at the user interface 102. If the requested page has not already been prefabricated, then the page request is sent to the computer application 104 to be fulfilled by dynamically fabricating the requested page.

A prefabricator 110 identifies information pages to prefabricate. Configuration settings and/or heuristics may be employed to predictively determine which information pages should be prefabricated. For each of these identified pages, a page request is sent from the prefabricator service module 110 to the interceptor 108. The interceptor 108 sends these page requests to the computer application 104. Each of these page requests from the prefabricator 110 is processed by the computer application 104 to fabricate a requested information page. The process at the computer application 104 to respond to a page request could be the same, regardless of whether the page request originates from the prefabricator service module 110 or the user interface 102. However, information pages generated in response to prefabricated page requests from the prefabricator 110 are cached by the interceptor 108, e.g., at a storage device 112. In contrast, information pages dynamically fabricated in response to a current page request from the user interface 102 are immediately sent to the user interface 102 for display. These contemporaneously fabricated pages may also be cached by the interceptor 108 for later access.

The prefabrication components of the invention may be installed at any physical or logical location in the computer system. Physically, the interceptor and prefabricator components may be located, for example, at the physical locations of the user interface, the computer application, or at other network locations such as a middle-tier web server computer. Logically, the interceptor and prefabricator components can be installed anywhere in the computer system, and/or integrated into other system components. In an embodiment, the interceptor 108 is integrated into a middle-tier web server or is logically located before it to intercept all communications between a user interface/browser and any applications accessed by the user running on a back-end data server.

It is noted that the format of page requests made to the computer application 104 could remain the same, regardless of whether prefabrication is being performed in the system. The interceptor component is configured to distinguish between ordinary page requests from the user interface and page requests from the prefabricator component, and to route the fabricated page from the computer application accordingly. Thus, introducing prefabrication components into a computer system need not result in modifications to a computer application. Instead, the present invention may be employed to non-intrusively prefabricate pages for any computer application, without requiring any or significant modifications to the computer application, merely by interposing the interceptor component in the communications path (e.g., at a web server) between the computer application and its corresponding user interfaces.

Figure 2:
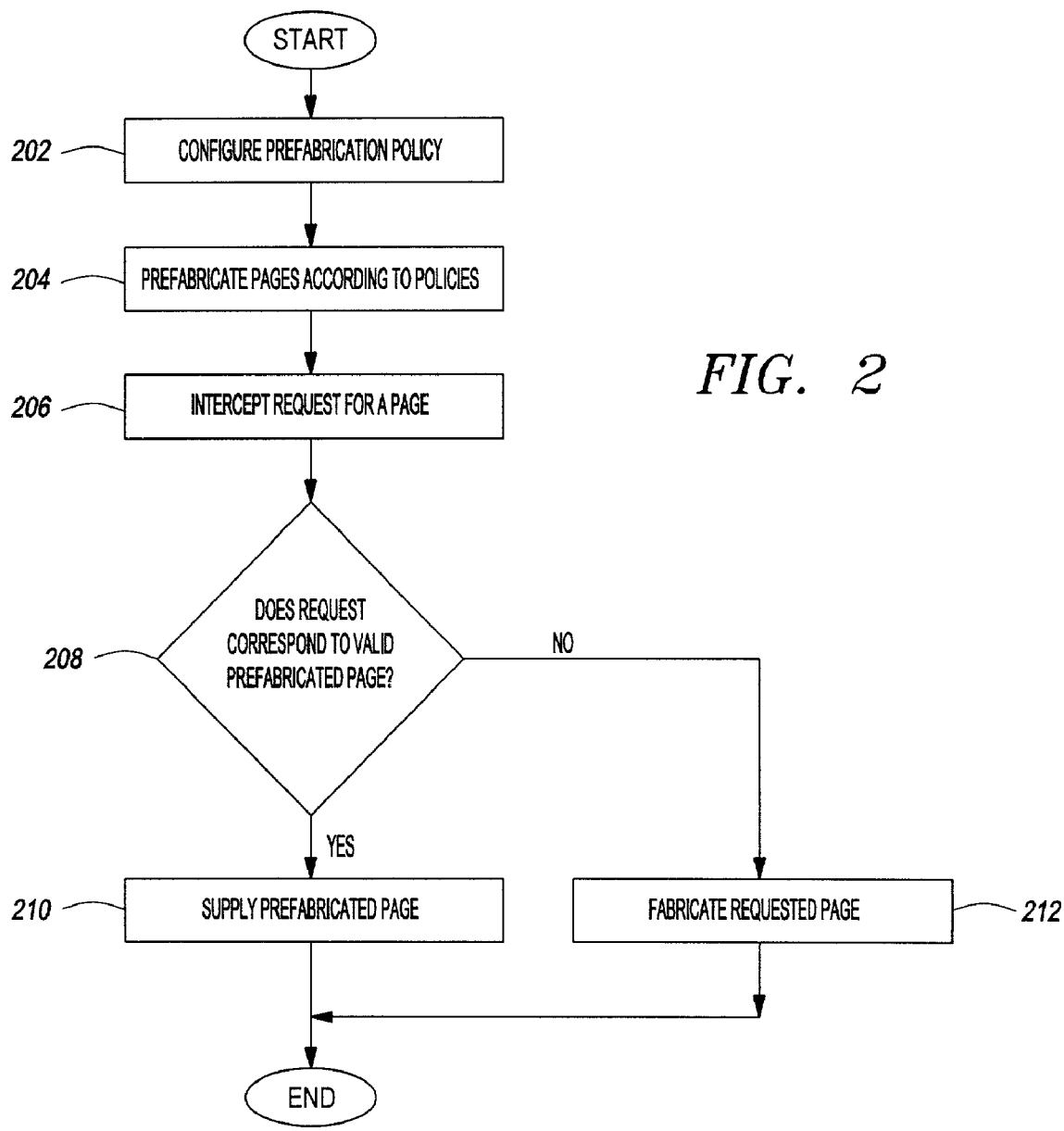
FIG. 2 shows a flowchart of a prefabrication method according to an embodiment of the invention.

FIG. 2 depicts a flowchart of a method for performing page prefabrication according to an embodiment of the invention. Step 202 of the method is directed to configuring one or more prefabrication policies for the system. A prefabrication policy is a set of configuration parameters that governs the manner in which prefabrication is performed. According to an embodiment of the invention, a prefabrication policy identifies some or all of the following: (1) the computer application that the policy applies to; (2) the users that the policy applies to; (3) the information pages to be prefabricated; (4) prefabrication scheduling and refresh interval(s); (5) responsibilities to prefabricate; and (6) prefabrication priorities.

To illustrate, the following sets forth an example of a set of prefabrication policy parameters for a computer application:

1. Policy Name: Guest User Policy
2. Application Name: Foo
3. Applies to: All users of Foo application with Guest responsibility 4. Time and Periodicity for Prefabrication: 2:00 A.M.—refresh daily
5. Depth of Prefabrication: all start pages and menu pages for identified users This is an application level policy that defines the prefabrication policies for users having "Guest" responsibility for the "Foo" computer application. In particular, this set of policies (entitled "Guest User Policy") states that the "start page" and menu pages for every such user of the Foo application will be prefabricated and stored every day at 2:00 A.M. According to an embodiment of the invention, a start page is an initial page displayed to a user. The start page could be the application's initially displayed page, an organization's home page, a user home page, or any other page designated as an entry page to be displayed to a user. The start page often contains hyperlinks or user selectable controls to view other displayable information pages. A "menu page" can be a tabbed, menu page that is hyperlinked from the start page.

Referring back to FIG. 2, the method thereafter prefabricates pages according to the defined prefabrication policy(s) (204). The exact steps to prefabricate a page depend in large part upon the specific contents of a page and the location of information in the page. In one embodiment, the same steps used to dynamically fabricate a page in response to a current user page request are also used to prefabricate a page in response to a prefabrication request. For an application that accesses data in a database, prefabrication may involve the steps of querying a database, processing data that is retrieved from the database, and packaging/rendering the resulting information in a specific format to be displayed to a user. The goal of the prefabrication process is to prefabricate a page as closely as possible to the page that the user would later "normally" retrieve without prefabrication. The prefabricated page would then be cached/stored for later access.

In operation, the prefabrication-enabled computer system filters page requests to intercept any page request that corresponds to a prefabricated page (208). If a pre-existing, valid prefabricated page responsive to the page request exists, then it is sent to the user for display (210). If the requested page does not exist or if the prefabricated page responsive to the page request is not valid, then the page request is sent to the computer application for contemporaneous fabrication (212). It is noted that prefabricated pages may be marked as being invalid under certain circumstances, e.g., if it becomes stale. The term "stale" refers to a prefabricated page in which the entire prefabricated page, or items of information located on the prefabricated page, is no longer considered to be valid. In one embodiment, staleness is based upon whether the creation/update time for a prefabricated page is within a threshold time period. A parameter can be established to determine the periodicity at which prefabricated pages should be created or updated to avoid staleness. Other approaches can also be used to establish staleness. For example, an alternate approach is based upon whether some or all of the information on the prefabricated page has been changed in a way that is relevant. Messaging can be used to determine whether some or all of the information on a prefabricated page has changed. The back-end database can send a message to the manager or location of the prefabricated page to indicate staleness. Alternatively, the cache server/prefabricator components can itself send a message to the back-end server to determine whether a prefabricated page is stale.

Illustrative Embodiments

Figure 3:
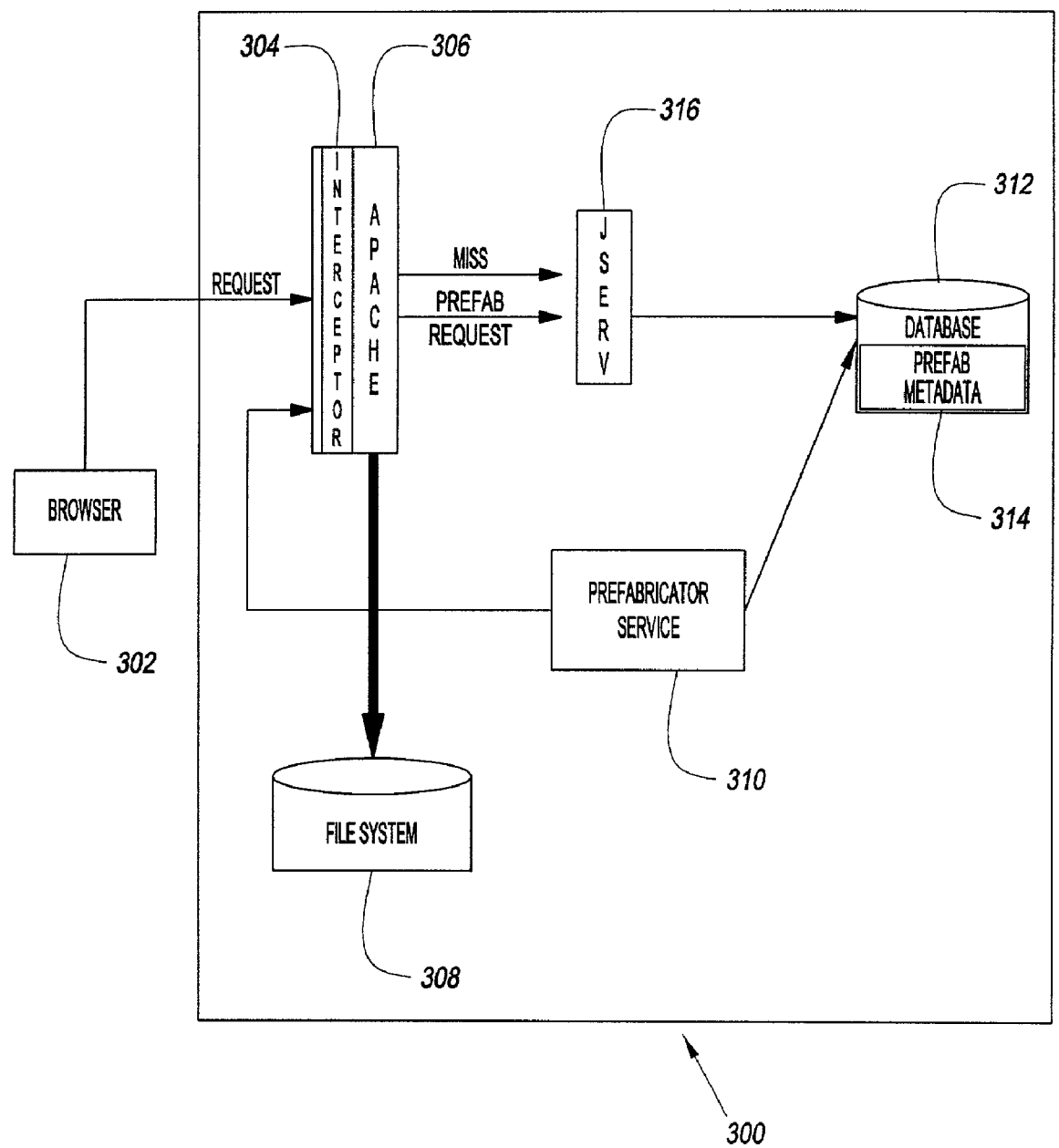
FIG. 3 illustrates a prefabrication system according to an embodiment of the invention.

FIG. 3 depicts an architecture 300 for page prefabrication according to an embodiment of the invention, in which an interceptor service module 304 is integrated with a web server 306. By way of example, web server 306 may be implemented as an Apache web server (available from www.apache.org) having server-side Java servlet functionality using the Apache Jserv module. The interceptor service module 304 can be implemented as a c-based extension that is compiled into the Apache web server code base. User page requests originate from a browser 302. Prefabricator page requests are generated by a prefabricator service module 310. The prefabricator service module may be located at either the same hardware location as the web server 306, or at any other machine location in the computer system. By way of example, the prefabricator service module may be implemented as a Java program co-located with the web server 306.

Page requests are sent to the interceptor service module 304 as Uniform Resource Locator (URL) requests. For user page requests, the interceptor service module 304 determines if the HTTP response for the requested URL has already been prefabricated and stored. The prefabricated HTTP responses are stored in a storage device 308.

If a valid, prefabricated HTTP response to the user requested URL is not available, then the URL request is dynamically processed by a Java servlet 316 to produce the desired HTTP response. The Java servlet 316 may access a database 312 to retrieve or process information associated with the URL. The HTTP response produced by the Java servlet 316 is routed to the browser 302 by the interceptor service module 304.

The prefabricator service module 310 accesses a set of prefabrication policies 314 to identify URLs that should be prefabricated. Prefabrication policies 314 can be stored at the database 312. Each URL identified to be prefabricated is sent as a prefabrication page request to the interceptor service module 304. The prefabricator URL requests are processed by one or more Java servlets 316 to produce the desired HTTP responses. The interceptor service module 304 distinguishes between HTTP responses from user page requests and HTTP responses from prefabricator page requests. The HTTP responses to prefabricator page requests produced by the Java servlet(s) 316 are stored in the storage device 308, before they are sent back to the prefabricator service module 310.

Figure 4:
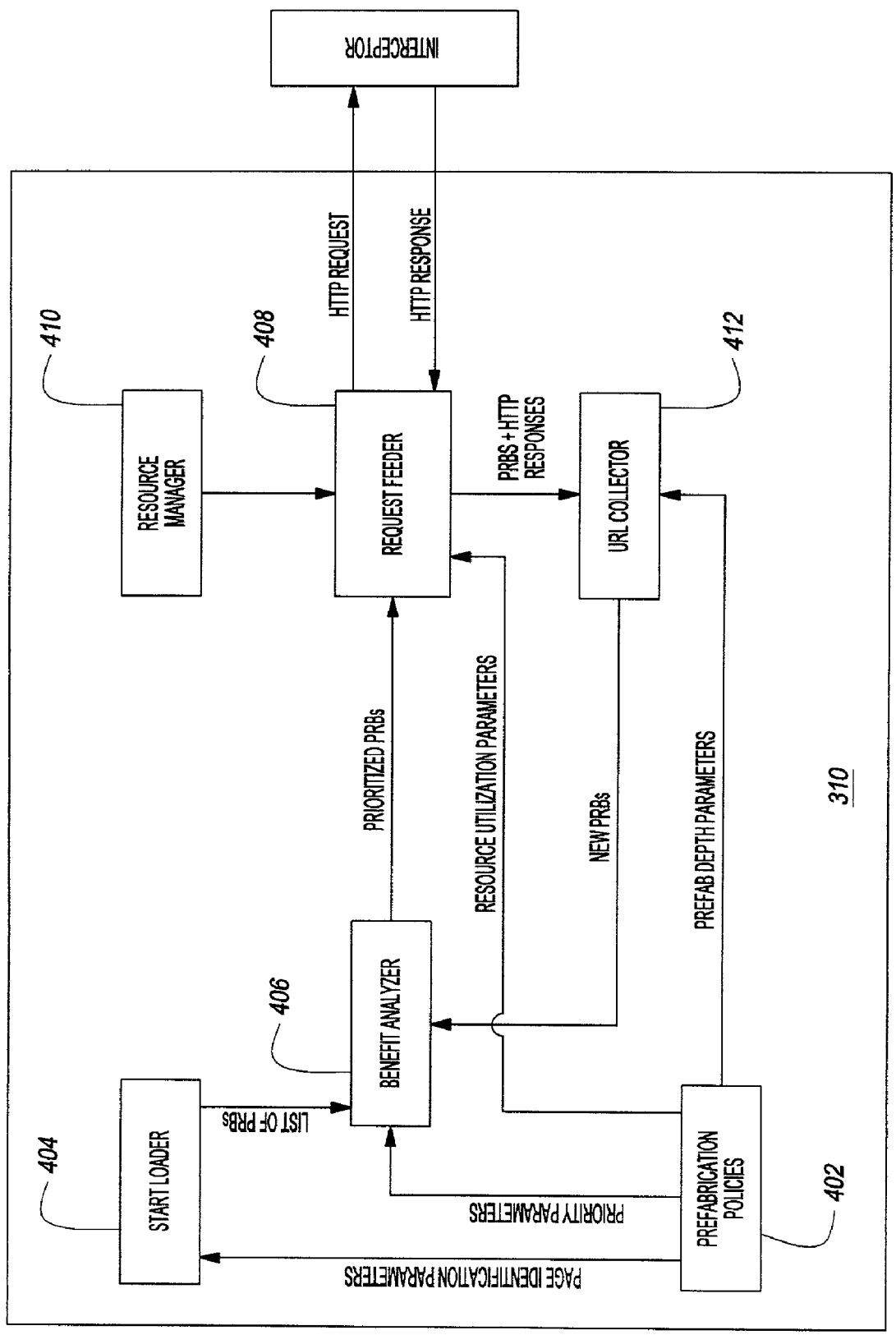
FIG. 4 shows a prefabrication service module according to an embodiment of the invention.

FIG. 4 shows components of an embodiment of the prefabricator service module 310. The start loader 404 performs the initial bootstrapping for the prefabricator service module 310. The start loader 404 accesses the defined prefabrication policies 402 for the system to determine an initial set of pages to prefabricate. Each identified page that is a candidate for prefabrication is represented as a formatted page request, referred to herein as a page request block (PRB). As described in more detail below, the initial set of identified pages may further identify links to other candidate pages that should be prefabricated.

One or more PRBs are sent from the start loader 404 to the benefit analyzer 406, with each PRB corresponding to a separate page to prefabricate. The benefit analyzer 406 prioritizes the list of PRBs based upon prioritization parameters established in the prefabrication policies 402. Examples of prioritization parameters include available system resources, page fabrication times, user access patterns, and the page depth of a PRB page. The benefit analyzer also determines a preferred batch size to process the PRBs. Once the benefit analyzer has prioritized and generated a batched set of PRBs to process, the set of PRBs is sent to the page request feeder 408.

The page request feeder 408 receives PRBs from the Benefit Analyzer 406 and issues HTTP requests based upon the received PRBs. The HTTP requests for the PRBs are sent to the interceptor service module for processing by the web server. The HTTP responses are sent from the interceptor service module/web server to the page request feeder 408. Each PRB, along with its associated HTTP response, is sent to the URL collector 412.

The page request feeder 408 is configured to concurrently handle multiple HTTP requests, by assigning PRBs to one or more processing entities (e.g., threads) that execute in parallel. The number of PRBs that is concurrently processed depends upon the level of available resources in the system. The greater the level of available system resources, the greater the number of PRBs that may be concurrently processed in the system. The prefabrication policies 402 may include parameters governing the level of system resources at which prefabrication procedures may execute or limit the quantity of system resources that may be consumed by the prefabrication policy.

The resource manager 410 monitors system resource usage, such as CPU and memory usage, both at the prefabricator location as well as the web server location(s), and indicates the level of system resources available to the prefabricator service module. The resource manager 410 provides system resource information used by the page request feeder 408 to throttle the rate in which HTTP requests are sent to the interceptor/web servers. The resource manager 410 can also be configured to provide information used by the page request feeder 408 to identify which web server or load balancer at which HTTP requests should be directed.

In this manner, the prefabrication system automatically adapts or "tunes" its processing to the changing conditions that exist in the system. This permits the prefabrication process to take full advantage of excess resources available in the system during periods of low resource usage, by automatically increasing the prefabrication workload. During periods of high resource usage, the prefabrication workload can be automatically lowered to minimize resource drains from other run-time work being performed by the system.

Each processed PRB and its associated HTTP response from the interceptor/web server are sent from the page request feeder 408 to the URL collector 412. The URL collector 412 crawls through the HTTP responses to identify new URLs that should be prefabricated. The new URLs form additional PRBs that are sent to the benefit analyzer 406 for prioritization and further processing. The prefabrication policies 402 define parameters used by the URL collector 412 to identify additional URLs that should be prefabricated. In one embodiment, the pages dynamically fabricated in response to an immediate user request can also be sent to the URL collector 412 to be crawled for pages that should be prefabricated.

To illustrate the operations of prefabricator service module 310, consider again the example prefabrication policy, described above, having the following policy parameters:

1. Policy Name: Guest User Policy
2. Application Name: Foo
3. Applies to: All users of Foo application with Guest responsibility
4. Time and Periodicity for Prefabrication: 2:00 A.M.—refresh daily
5. Depth of Prefabrication: all start pages and menu pages for identified users As previously noted, this is an application level policy that defines the prefabrication policies for users having "Guest" responsibility for the "Foo" computer application, where the "start page" and "menu page" for every such user of the Foo application will be prefabricated and stored every day at 2:00 A.M.

When this prefabrication policy is executed, the start loader 404 in the prefabricator service module 310 performs the action of identifying the URLs of the start pages for all relevant users (i.e., "Guest" users) of the Foo computer application. In some circumstances, the start loader 404 may also identify some or all of the URLs for the menu pages for the relevant users. PRBs corresponding to the identified URLs are sent to the benefit analyzer 406.

The benefit analyzer 406 prioritizes the PRBs and sends a series of PRB batches to the page request feeder 408. Various prioritization procedures may be employed. In this example, an applicable prioritization procedure is to give higher priority to start page URLs and lower priority to other URLs having higher depths in the page hierarchy, i.e., menu page URLs. Thus, the initial batch of PRBs identified by the benefit analyzer 406 should be directed to higher priority URLs.

The page request feeder receives system resource information from the resource manager 410. Based upon this system resource information, the page request feeder 408 determines the number of PRBs that may be concurrently processed at any moment in time. The PRBs are assigned to the processing entities that work for the page request feeder 408. HTTP requests are sent by the processing entities to the interceptor/web server. HTTP responses to the HTTP requests are returned from the interceptor/web server, and are attached or logically associated with the original PRBs.

The PRBs and the associated HTTP responses are sent to the URL collector 412. The URL collector 412 attempts to identify additional URLs that should be prefabricated. In this example, the prefabrication policies indicate that both start pages as well as menu pages should be prefabricated. Thus, the URL collector 412 crawls through the HTTP response for each start page to attempt to identify URLs for additional menu pages. The URLs for the identified menu pages are packaged as new PRBs that are sent to the benefit analyzer 406.

The benefit analyzer 406 reprioritizes the set of pending PRBs based upon the new PRBs received from the URL collector 412, and sends another batch of PRBs to the page request feeder 408. The above process continues until all the PRBs have been processed or until the processing time period for the policy expires.

A scheduler (not shown) coordinates the activities of the components within the prefabricator service module 310. In one embodiment, the scheduler is a thread that monitors the prefabrication policies, and determines which policies become active and which policies are scheduled to end.

Figure 5:
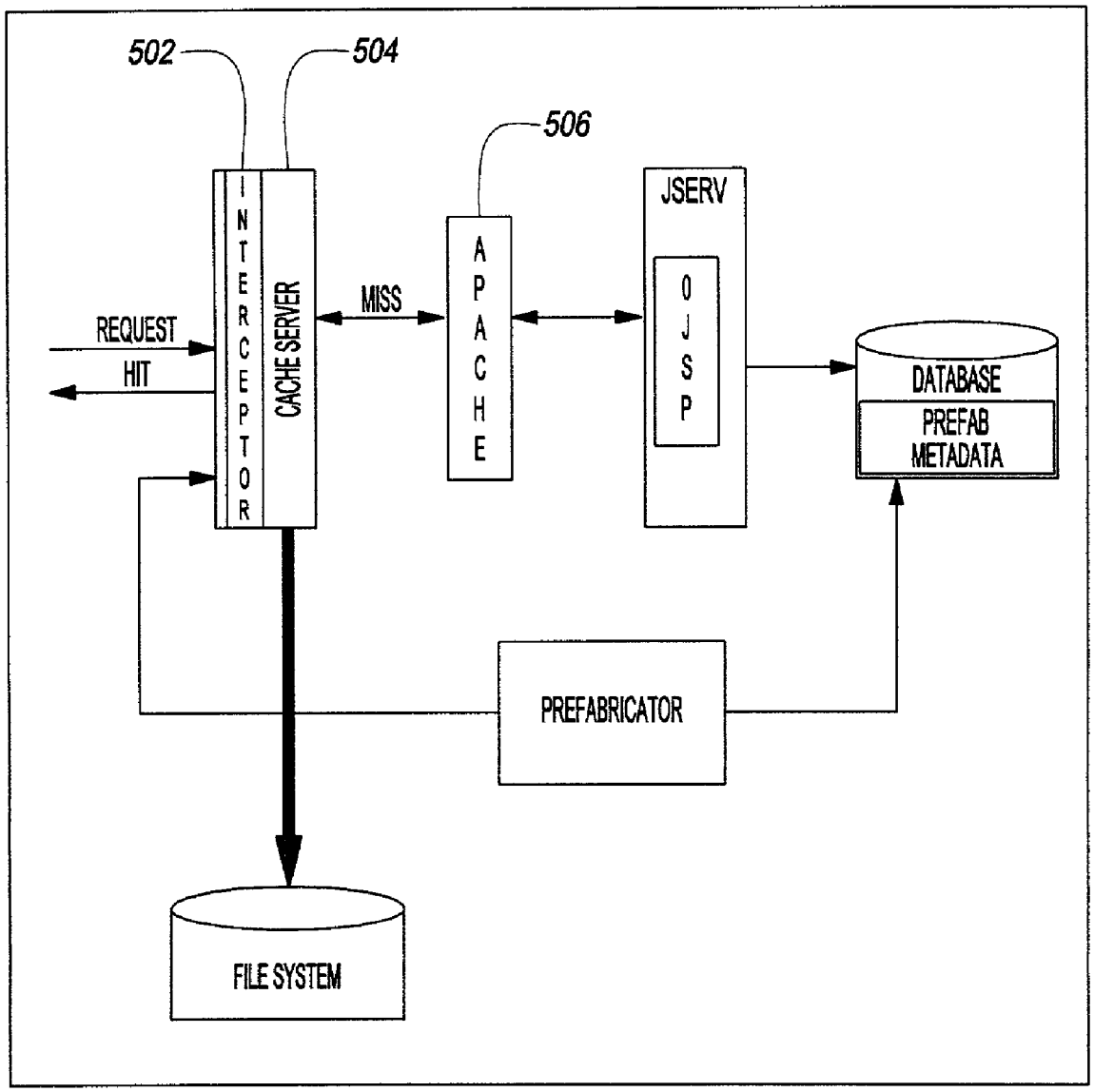
FIG. 5 illustrates an alternate prefabrication system according to an embodiment of the invention.

FIG. 5 depicts an alternate embodiment of the invention, in which the interceptor service module 502 is integrated with a cache server 504. The cache server 504 is interposed between users and the web server 506. In this approach, the cache server 504 manages the storage and retrieval of prefabricated pages. This is in contrast to the approach of FIG. 3, in which the prefabricator system components are responsible for storing and retrieving cached prefabricated pages. An exemplary cache server 504 usable with the invention is described in more detail in co-pending U.S. patent application Ser. Nos. 09/650,498 and 09/649,850, entitled "Multi-Tier Caching System" and "Performance-Based Caching", respectively, both filed on Aug. 29, 2000, which are hereby incorporated by reference in their entirety.

Multi-Node Prefabrication System

The present invention can be scalably deployed to perform coordinated prefabrication services on multiple, distributed computing nodes. By way of example, if embodiments of the invention are employed in a system configuration having multiple middle-tier machines, then the prefabricator service can be started on some or all of the middle-tier machines to share the prefabrication workload. Each prefabricator instance produces its allocated portion of the prefabricated pages, and stores the prefabricated pages in a network accessible storage device. When a user requests an information page, any of the web servers operating within the prefabrication system can determine if the requested page has been prefabricated. If so, then the web server retrieves the prefabricated page from the particular network accessible device upon which the prefabricated page was stored.

Figure 6:
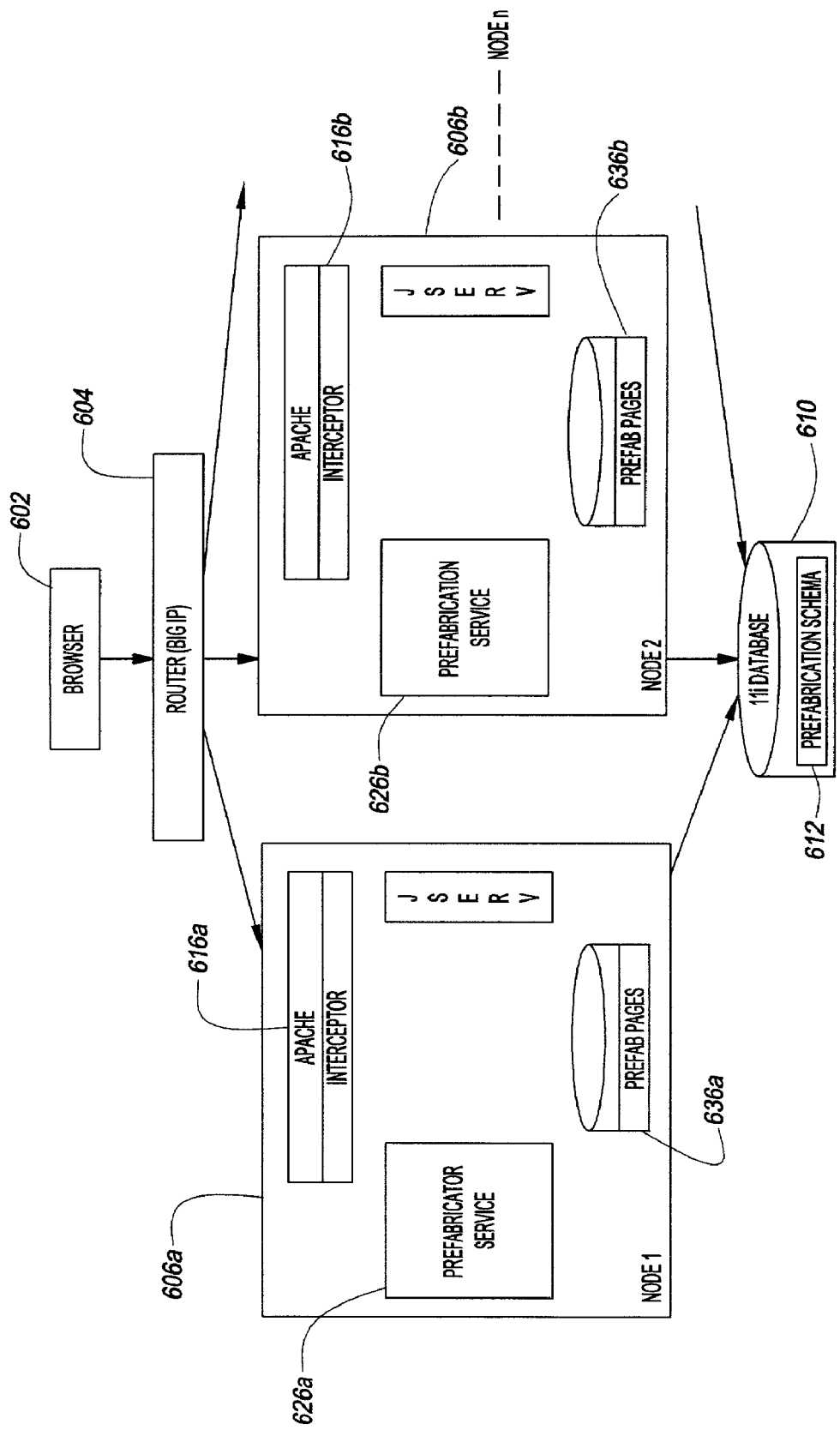
FIG. 6 shows an n-node prefabrication system according to an embodiment of the invention.

FIG. 6 depicts one embodiment of the invention for an "n-node" architecture, in which multiple middle-tier machines exist in the distributed computer system. Shown in FIG. 6 is a first middle-tier node 606a and a second middle-tier node 606b. Each node 606a and 606b can access the same computer applications, e.g., database application 610, to generate a requested information page. Each middle-tier node 606a and 606b includes prefabricator components, such as an interceptor 616a and prefabricator 626a on node 606a, and an interceptor 616b and prefabricator 626b on node 606b. Node 606a stores prefabricated pages in a storage device 636a, while node 606b stores prefabricated pages into a storage device 636b. In an embodiment, storage devices 636a and 636b are both NFS-compatible storage devices accessible from other network nodes.

When a user page request is sent from browser 602, the page request is routed to one of the middle-tier nodes 606a or 606b by router/load balancer 604. The node presently handling the page request determines if a valid, prefabricated version of the requested page exists somewhere in the system. If so, then the node retrieves the prefabricated page. If the page was not locally prefabricated, and the prefabricated page is stored in a network accessible file system like a remotely produced prefabricated page, then the node retrieves the page from the network accessible file system. If the locally produced prefabricated pages are stored in a local cache or storage device, then a local request for that page would result in retrieval from the local cache or storage device. If the page was prefabricated at another network node, then the prefabricated page is retrieved from the network accessible storage device, and sent to the browser 602 for display.

Figure 7:
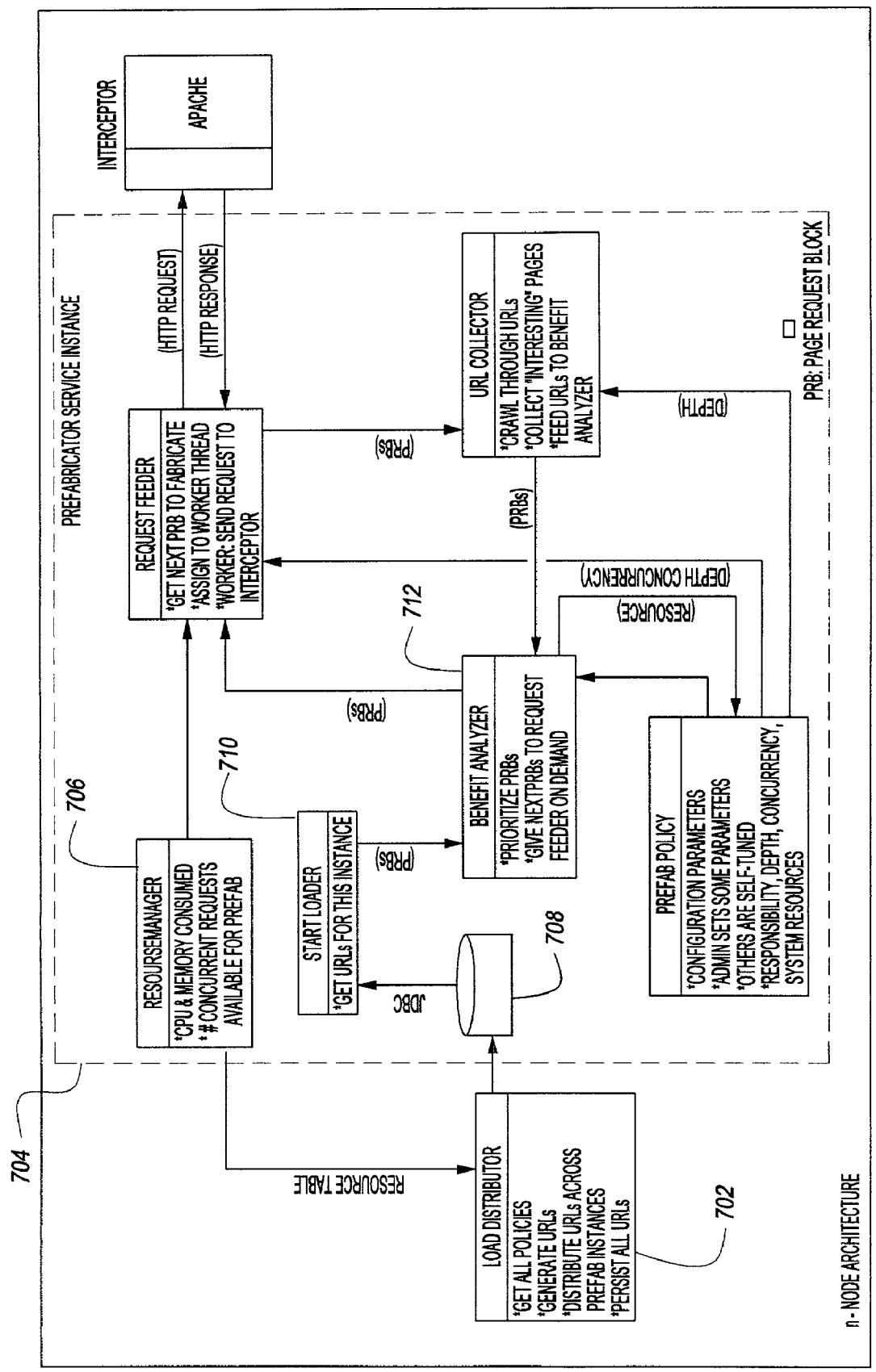
FIG. 7 shows prefabrication components for an n-node prefabrication system according to an embodiment of the invention.

To describe how prefabricator workload is distributed among multiple nodes, shown in FIG. 7 are prefabricator components for an n-node prefabricator system according to an embodiment of the invention. The n-node prefabricator system includes a load distributor 702 that is responsible for distributing the page prefabrication workload. The load distributor 702 divides a given prefabricator workload among multiple prefabricator nodes. Each prefabricator node includes a prefabricator service instance 704. While only a single prefabricator service instance 704 is shown in FIG. 7, it is noted that multiple such prefabricator service instances may exist in the distributed system. In one embodiment, the load distributor 702 is located at the same machine as one of the prefabricator service instances 704. In an alternate embodiment, the load distributor 702 is located on a separate machine.

The load distributor 702 accesses all prefabrication policies to determine the current prefabrication workload for the distributed system. Based upon the prefabrication policies, the load distributor 702 identifies the pages to prefabricate. For each identified page, a page request PRB is created.

The load distributor 702 divides the set of PRBs across the fabricator nodes in the system. In an embodiment, workload distribution is based upon the resource usage and availability levels of each prefabricator node. Prefabricator nodes having higher resource availability levels are assigned more work while prefabricator nodes having lower resource availability levels are assigned less work. Examples of resource usage parameters that may factor into the workload distribution decision are CPU, memory, and current prefabrication request levels at each prefabricator node. For this reason, the resource manager 706 at each prefabricator service instance 704 preferably communicates resource usage information to the load distributor 702.

A first approach to assigning work to prefabricator nodes involves looking at resource utilization levels in a global way, where the entirety of the workload is distributed across all the participating nodes to balance resource usage across the entire system. The total resource "headroom" for each node is identified to make the workload allocation. A second approach to assigning work involves looking at each prefabrication node on an individual basis, and assigning work to a node only within the exact resource utilization constraints that have been imposed for that node.

The load distributor 702 maintains a PRB data structure that lists all PRBs to prefabricate as well as the identity of the specific prefabricator node assigned to each PRB. The PRB data structure can be stored as a table in a database 708. The start loader 710 at each prefabricator service instance 704 scans the PRB data structure to identify the PRBs assigned to that instance. The assigned PRBs for the prefabricator service instance 704 are sent to the benefit analyzer 712 for that instance 704 for prioritization and further processing. The processing of the PRBs thereafter is substantially identical to the processing of PRBs as described with reference to FIG. 4, with the exception that the HTTP response is stored in a network accessible network storage device. In addition, the completed PRBs are identified as such in the PRB data structure. In an embodiment, the PRB data structure is the same as the user page table, described in more detail below.

The load distributor 702 can be configured to distribute the prefabrication workload at a number of occasions. For example, the load distributor 702 may redistribute the workload at prefabrication system startup time, at predefined intervals, or when a "redistribute workload" command is explicitly issued. Each prefabricator instance can be configured to periodically log a set of statistics or status messages in a database. These statistics can be used to identify load imbalances across the system that can be corrected by redistributing the workload. In addition, the periodic reports can be used to identify error conditions at the distributed nodes. For fault tolerance purposes, load redistribution may also occur based upon identifying an error or problem at one of the prefabrication nodes.

The present invention can therefore be effectively scaled over any number of prefabricator nodes, merely by distributing the prefabrication workload over the prefabrication nodes in the system. The excess resources in all prefabricator middle-tier nodes can be harnessed by appropriate distribution or redistribution of additional workloads to those nodes having excess resource availability levels. On the other hand, those nodes having lower available resources are assigned smaller portions of the prefabrication workload. Regardless of the quantity of prefabrication workload that is assigned to a given node, all nodes equally participate in the benefits of prefabricated pages, since all prefabricated pages, even pages prefabricated by other nodes, are universally accessible from networked storage devices.

PRB—Page Request Block

Figure 8:
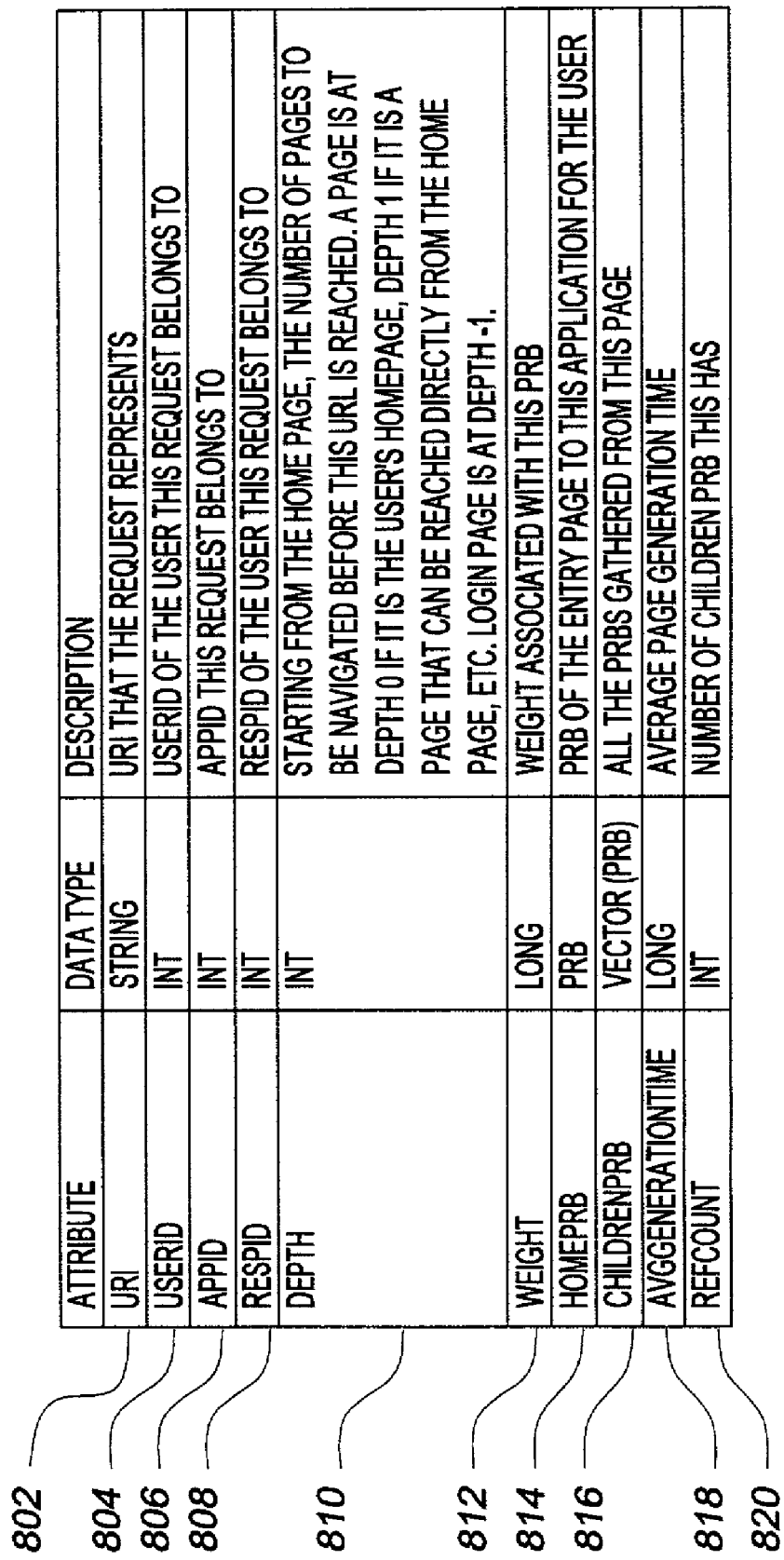
FIG. 8 shows a PRB schema according to an embodiment of the invention.

According to an embodiment, information pages that are candidates for prefabrication are internally represented as formatted page requests or PRBs. FIG. 8 shows a PRB structure according to one embodiment of the invention. Attribute 802 identifies the specific uniform resource identifier (URI), e.g., URL+cookie information, associated with a PRB. Attribute 804 identifies the user identifier of the user associated with the PRB request. Attribute 806 sets forth the application identifier associated with the PRB. Attribute 808 sets forth the responsibility identifier for the PRB. Attribute 810 defines the page depth for the PRB request. If the start page or home page is considered depth "0", the next additional navigational level from that start/home page is considered depth "1", the next immediate navigational level from level "1" is considered depth level "2", etc. The depth attribute 810 identifies the depth level of the URI associated with the PRB. The weight attribute 812 identifies the prioritization weight associated with the PRB, which is computed and used by the benefit analyzer component to sort the list of pending PRBs. Attribute 818 identifies an average page generation time. The average generation time is set by the Page Request Feeder component once a PRB has been fabricated.

An inherent hierarchy exists between many PRBs within the system. A PRB (A) that is created by identifying URIs in the page represented by another PRB (B) is referred to as a child of PRB (B). Any PRB can have zero or more child PRBs. The child PRBs are considered to be at a depth of one more than the depth of the parent PRB. Attribute 814 identifies the entry page for this application of the present PRB. Attribute 816 identifies the child PRBs for the present PRB. Attribute 820 identifies the number of child PRBs to the present PRB.

In an embodiment, PRBs being processed by the system are stored in-memory in a UserPageTable, which is described in more detail below. This table preferably persists in a database. A history table is maintained in one embodiment to track all PRBs processed by the system for a given application. Statistics, such as the frequency or rate of change for a PRB, are maintained in the history table. These statistics can be used to modify or update weighting algorithms for PRBs. PRBs that are very old and which are not recently or frequently accessed can be expunged from the history table.

Prefabrication Policy

This section describes the structure of prefabrication policies according to an embodiment of the invention. According to an embodiment, the prefabrication policy contains configuration information used to bootstrap and tune the prefabricator. The prefabrication policies are preferably striped by application and are stored as persistent information in a database. The prefabrication policy identifies some or all of the following: (1) the computer application that the policy applies to; (2) the users that the policy applies to; (3) the information pages to be prefabricated; (4) prefabrication scheduling and refresh interval(s); (5) responsibilities that the policy applies to; and (6) prefabrication priorities. A hierarchy of different categories of policies can be used in the invention, such as the following categories:

System Resource Policies: This type of policy applies at a system-wide level, and establishes system resource conditions under which the prefabrication process is permitted to operate. Examples of this policy type would include policies that specify a CPU consumption limit, available memory, or disk space limitations.

Application Level Policies: This set of policies applies at an application-wide level, and establishes prefabrication parameters for specific computer applications in the system. For a given application, this set of policies can be used to establish, for example, the time of day at which the prefabrication process is performed, the periodicity with which pages are prefabricated (to prevent staleness), and the identity, type, and/or quantity of pages that should be prefabricated. One or more application level policies may be established for a given application.

Responsibility and User level Policies: These sets of policies applies to specific responsibilities and users within an application. In an embodiment, these policies are a subset of the application level policies, and will override any setting at the application level. Each application may correspond to multiple responsibility and user level policies.

Transient policies: These are run-time policies that the prefabricator service auto-tunes as it runs. In one embodiment, this type of policy is calculated at run-time and is based upon the availability of resources and current state of the system. An example includes a policy that tunes the number of PRBs concurrently processed by the request feeder. The parameters of the system resource policies can be used to implement transient policies. In an embodiment, these policies are not persisted in the database.

At the java-layer or middle-tier, policies can be represented as object instances of a Policy class. Some of the properties in the Policy object are persistent while others are transient. The following is a list of properties for the Policy class that may be employed in one embodiment of the invention:

applicationID): the unique ID associated with an application. (persistent)

isEnabled: determines if prefabricator is enabled or disabled for the application corresponding to the applicationID. (persistent)

startTime: the time at which the prefabricator service should be started for this policy. In one embodiment, this property cannot be modified at the responsibility or user level. (persistent)

endTime: the time (if any) at which the prefabricator service should be stopped for the policy. In one embodiment, this property can be modified at the responsibility or user level. (persistent)

interval: the periodicity with which the prefabricator service should regenerate pages. This property represents a "staleness" threshold for prefabricated pages. In one embodiment, this property can be modified at the responsibility or user level. (persistent)

depth: this represents the desired depth for which pages are prefabricated. By way of example, this property represents whether only home/start pages, all pages, or a defined depth x of pages of the application should be prefabricated. In one embodiment, this property can be modified at the responsibility or user level. (persistent)

currentDepth: this property represents the actual depth the prefabricator service auto-tunes to prefabricate based on availability of system resources and other heuristics. For example, if the "depth" parameter for the policy indicates that 4 levels of pages should be prefabricated, but system resource levels only allow 1 level of pages to be prefabricated, then the "currentDepth" parameter is set to "1".

currentBatchSize: this represents is the number of concurrent requests that the page request feeder sends to the web server based on availability of system resources and other heuristics.

cpuConsumptionLimit: this property identifies an upper limit on the maximum percentage of the CPU the system should utilize. In one embodiment, this is a system wide parameter. (persistent)

memoryConsumptionLimit: this property identifies a lower limit on the amount free memory that should exist in the system. In one embodiment, this is a system wide parameter. (persistent)

diskSpace: this property indicates the amount of disk space that is available to store the prefabricated pages. In one embodiment, this is a system-wide parameter. (persistent)

isAllResp: this property determines whether policy should run for all responsibilities of the application. (persistent)

isAllUser: this property determines whether policy should run for all users. (persistent)

Figure 9:
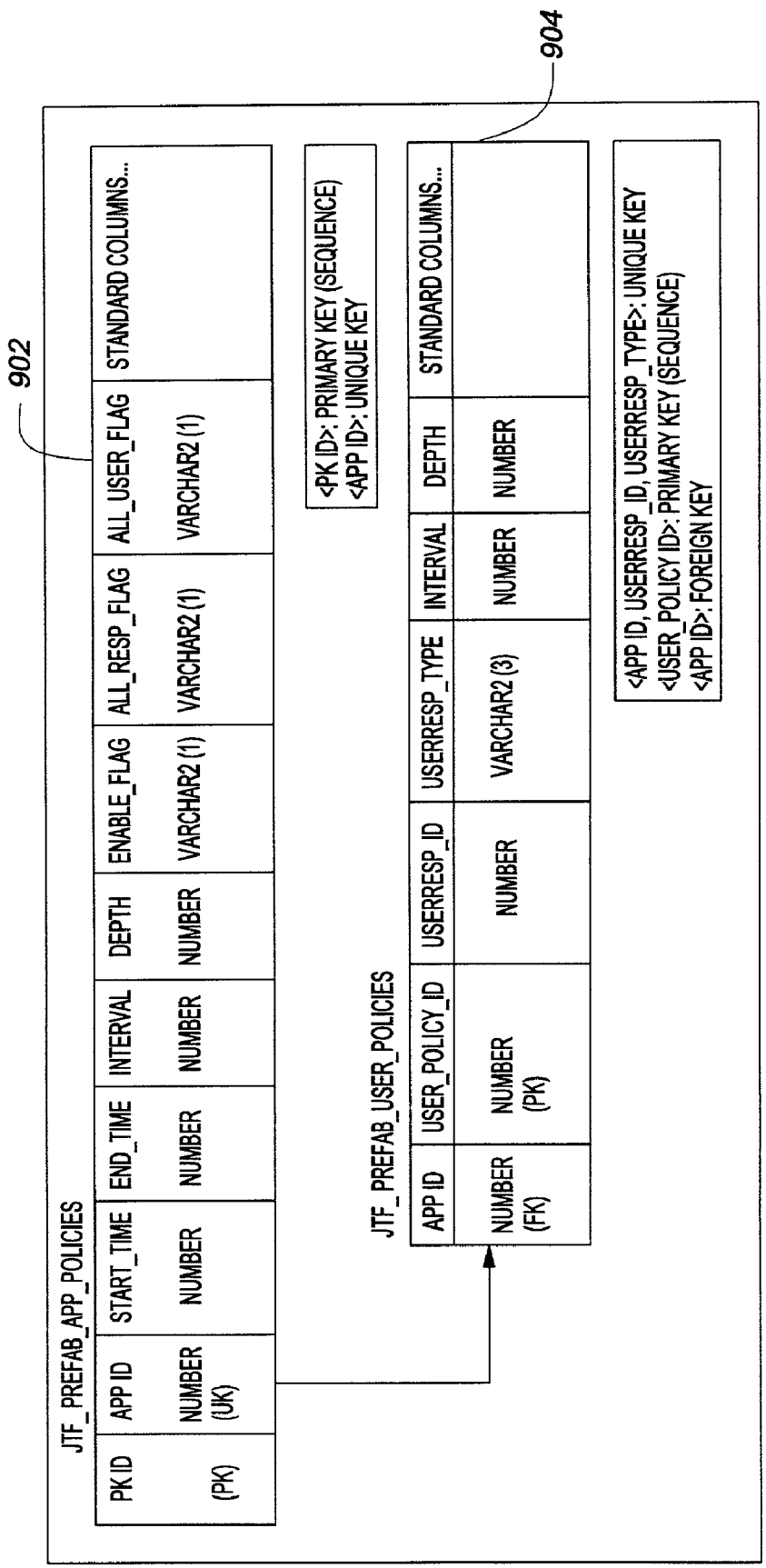
FIG. 9 shows prefabrication policy schemas according to an embodiment of the invention.

FIG. 9 shows a schema for persisting policies according to an embodiment of the invention. For every application, there is one row in a prefabrication application policy table 902 that persists application-level policies. Based on whether any responsibility or user-level policies are configured, there are zero or more corresponding rows in a prefabrication user policy table 904. Table accessor methods are implemented in a procedural query language, e.g., PL/SQL, and invoked from the Java layer, e.g., using JDBC.

As a security measure, policy information is preferably maintained or modified only by appropriately authorized administrators. When an administrator changes a policy, it is preferably immediately updated and propagated, e.g., to the relevant database tables at which the policies are stored.

In an embodiment of the invention, for every application the prefabricator services is processing, a Policy object is instantiated on the prefabricator service side. A policy thread/process is configured to periodically refreshes the persistent properties of the Policy objects. In an embodiment, each prefabricator service is dedicated to only one application, i.e., if there are three applications to be prefabricated, then three instances of the prefabricator service are started. In this approach, a prefabricator service instance corresponds to only Policy object instances for this application and the policy thread/process will refresh only the policies for this application. In an alternate embodiment, a prefabricator service is configured to support multiple applications. In this alternate approach, multiple policy objects belonging to multiple applications are associated with a prefabricator service instance.

Different components in the prefabricator service access the policy object. For example, the start loader component accesses the policy object to identify the users and responsibilities configured for a given application, and to generate the initial workload. The benefit analyzer accesses the policy object to identify system configurations and refresh intervals. The benefit analyzer also updates the currentDepth property in the policy object. The page request feeder sets up the currentBatchSize property based upon the number of concurrent requests that can be handled. The URL collector reads the currentDepth property information to decide whether to crawl a prefabricated page.

User Page Table

An in-memory data structure, referred to herein as the User Page Table, keeps track of all the PRBs that the prefabricator service is processing in an embodiment of the invention. The contents of the User Page Table represent the entire set of PRBs that have been identified for prefabrication. The User Page Table includes both PRBs that have been prefabricated as well as those not yet prefabricated, and includes data indicating which PRBs have been prefabricated.

In an embodiment, the User Page Table is frequently accessed, queried, and updated by the Benefit Analyzer component. Indexes can be built that allow querying of the user page table using some of the PRB attributes. The index tables are constructed as Hashtables, with the key being the PRB property and the value being a Vector of PRBs that have the same key-property value. The User Page Table can itself be implemented as a Vector of PRBs. FIG. 10 provides a list of index tables built for fast access of the user page table elements according to one embodiment of the invention.

In an embodiment, the Benefit Analyzer is the only component in the prefabricator service module that directly invokes changes to User Page Table. The Benefit Analyzer can be configured to ensure that no duplicate PRBs (i.e, two PRBs with the same URI) are added to the table.

Start Loader

This section describes a start loader according one embodiment of the invention. The start loader generates the initial set of PRBs to be processed by the prefabricator service. A default implementation of the start loader provides a mechanism to generate all possible URIs for user start/home/entry pages, based on the applications, responsibilities and users configured in the Prefabricator Policy. In an embodiment, applications can override this default implementation to provide application specific logic for determining the entry page URIs for users. Every URI generated by the start loader is represented as a PRB and passed on to the Benefit Analyzer component. It is noted that other mechanisms, in addition to the start loader, may also be employed to generate the initial workload for the prefabricator service. For example, the set of PRBs created in a prior prefabrication session, including PRBs previously generated from the URL collector, can be used as the initial workload for a present prefabrication session. This alternate approach is useful for pages that tend to remain static over time.

Referring to FIG. 11, shown is a start loader process flow according to one embodiment of the invention. The Start Loader is instantiated as a thread and the constructor takes in an application ID as an input. The application ID is used to retrieve the appropriate prefabricator policy. From the prefabrication policy, a determination is made of the appropriate set of responsibilities and userIDs for which the workload needs to be generated. The Start Loader thread regenerates the initial workload periodically, e.g., twice a day or every time the prefabricator is started. This ensures that any new users registered in the system and other such changes are captured by the initial workload.

Figure 12:
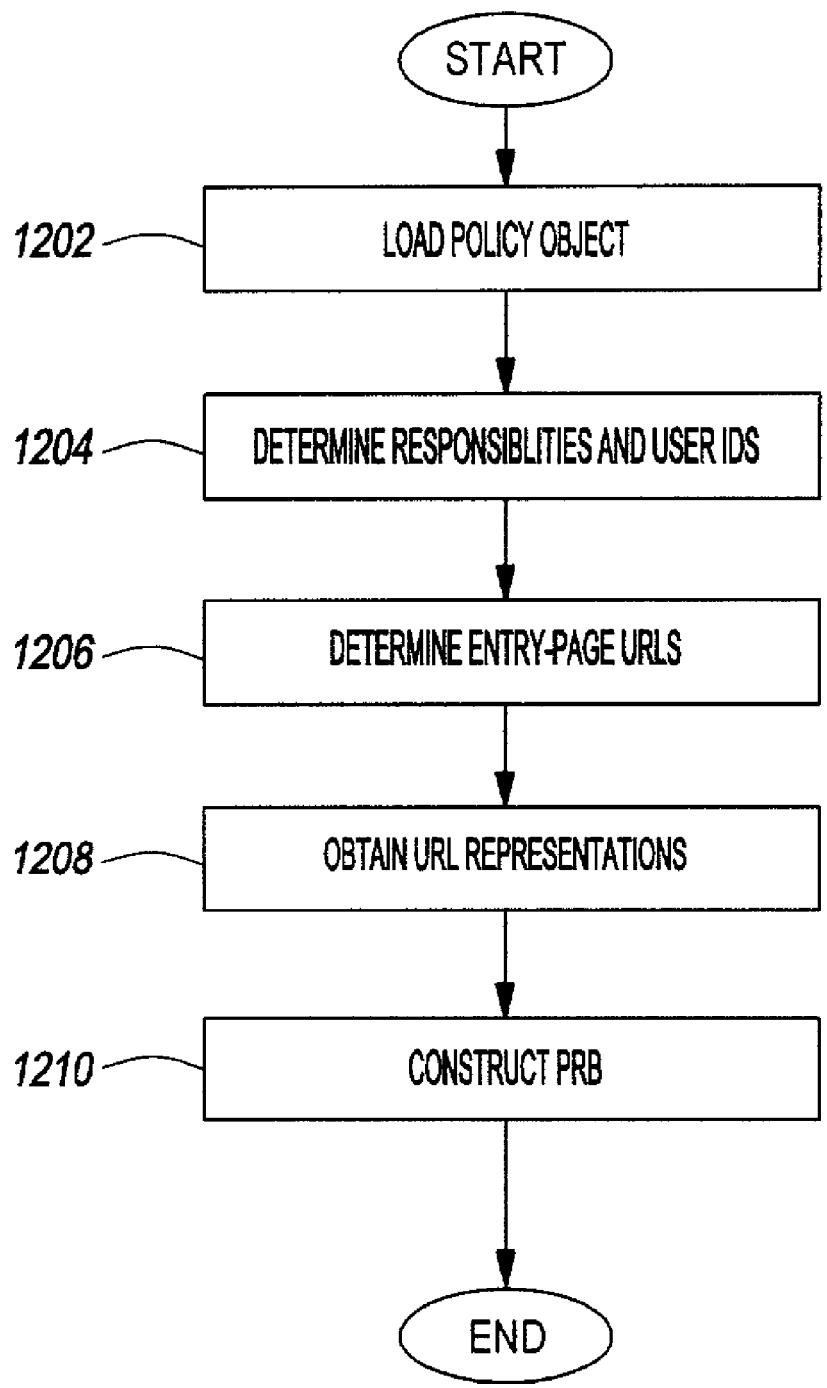
FIG. 12 depicts a flowchart of a process for constructing PRBs according to an embodiment of the invention.

FIG. 12 shows a flowchart processing logic for generating PRBs for the appropriate entry-level pages resides in the implementor of the URLParameterInterface, according to an embodiment of the invention. At 1202, the implementor loads the prefabricator policy object associated with the application ID.

Using the Policy object, the method identifies the special responsibilities and user ID configured for the policy (1204). If no special responsibilities are configured, then it is assumed that all responsibilities within the application need to be prefabricated. Else, only the configured set of responsibilities are used. In addition, the process ensures that all configured userIDs are generated in the initial workload. Unlike responsibilities, this set of users may not be the only users for which prefabrication is turned on. A determination is made regarding a valid set of userIDs that match the configured set of responsibilities. In addition, a determination is made regarding the responsibility identifiers for the userIDs configured. User ID and responsibility tables can be maintained and queried to perform these determinations. The prefabricator logs into the system as a trusted user, and then switches identity to a specific user when it is prefabricating a page for that user.

The method determines the entry page URI for every applicable user ID (1206). Using application specific logic and data, the component that generates the initial workload generates URL values for all users it is prefabricating for (1208). These URL representations are appended to the previously obtained URI. The method thereafter constructs a PRB for each generated URI (1210). The constructed PRBs are sent to the benefit analyzer for further processing and prefabrication.

Benefit Analyzer

This section describes an embodiment of the benefit analyzer. At any given point of time and state of the prefabricator system, the benefit analyzer determines the next set of pages to prefabricate. In one approach, the benefit analyzer is executed as a single thread.

The benefit analyzer maintains an in-queue of pending PRBs. The in-queue contains all the PRBs to be processed once at any point in time. The in-queue is populated by PRBs from either the start loader or the URL collector. As noted above, the start loader produces the initial bootstrapping workload. The URLCollector produces new PRBs for the benefit analyzer by crawling previously processed PRB outputs. The benefit analyzer also uses the User Page Table to identify the workload of PRBs to process. The benefit analyzer maintains an out-queue of PRBs to send to the page request feeder.

The benefit analyzer uses a weighting algorithm to prioritize the queue of pending PRBs and to associate a weight with every PRB in the system. In one embodiment, the weight (w) is related to the following:

- $w \propto 1/\text{depth}$ (where home page is at depth 0, menu-pages are at depth 1, submenus at depth 2, etc.)
- $\propto$ time to process PRB (in one approach, a slower PRB is better candidate for prefabrication than an already fast PRB)
- $\propto$ parameter-relevance (e.g., userID's configured in policy may have higher weight than others)
- $\propto$ user-hit ratio (highly accessed PRBs are more important than others)

The weight (w) of a PRB can be defined as:

$$w = k * 1/\text{depth} + p * t_{processPRB} + q + r * \text{hit-count}$$

where, k, p, q, and r are selected constant-values. For the hit-count, a feedback mechanism is implemented from the web-server to the prefabrication service. If this mechanism does not exist, then constant "r" can be set to 0. In a preferred embodiment, the depth factor is the most important factor. Hence, constant "k" is set to a higher value than "p" and "q." The exact weighting formula and weighting constants is a design choice based upon the exact application and set of performance requirements to which the invention is directed. The in-queue of the benefit analyzer is prioritized based on PRB weights. The benefit analyzer thereafter passes the next, prioritized PRB to be processed to the page request feeder, on demand.

In one embodiment, the applicable policies may also be prioritized by the benefit analyzer. The requirements of first policy could be given higher priority than the requirements of a second policy. For example, if a first policy has a higher priority than a second policy, then the set of PRBs produced in response to the first policy is given greater weight than the set of PRBs produced in response to the second policy.

In one embodiment, the Benefit Analyzer is configured to generate, track, or maintain the following statistics: (1) Number of PRB generated; (2) Average refresh rate; (3) Total number of PRBs in the system—user page table size; (4) Optimal batch size; (5) Current depth; (6) start time of policies; (7) end time of policies; (8) duration of run; and, (9) hit ratio=(number of prefabricated URIs accessed)/(total number of URIs user requested).

Page Request Feeder

This section describes an embodiment of the page request feeder. The page request feeder initiates page generation from the PRBs. Based on the current system snapshot, the page request feeder sets the number of concurrent requests to send to the web-server, receives the responses back, and passes the page response to the URL Collector. The Page Request Feeder receives PRBs to be processed as input from the BenefitAnalyzer. The page request feeder also uses the optimal batch size value and maximum CPU consumption limit value from the Policy object.

The Page Request Feeder includes a "monitor" processing component (e.g., monitor thread) and a changing number of "worker" components (e.g., worker threads). The monitor thread is responsible for dynamically changing the number of concurrent requests to send to the web server based on the current system snapshot. The monitor thread uses the following steps to dynamically adjust the number of requests: (1) The monitor thread checks if the current CPU utilization in the system is less than the maximum CPU value configured in the policy object; (2) the number of outstanding page requests is checked to determine if it is less than the optimal value listed in the prefabrication policy; and, (3) if both of the above conditions are met, then one or more PRBs are retrieved from the benefit analyzer and passed to a free worker thread, or to a new, created worker thread if none is presently available.

Each worker thread is responsible for performing the following steps: (1) taking a PRB from the request feeder's in-queue; (2) sending a HTTP Request to process the URI in the PRB; (3) appending the HTTP Response to the PRB; and (4) passing the PRB to the URL collector.

In one embodiment of the invention, the page request feeder's concurrency level, or number of outstanding requests, is controlled by the benefit analyzer. However, this approach may cause a delay in the prefabricator system adapting to changes in the middle-tier or database workload. Thus, in an alternate embodiment, the benefit analyzer determines the optimal concurrency, but the request feeder calculates the adaptive or current concurrency it should support. This provides better reaction time to bursty traffic on the webserver, or sudden changes in the system load.

URL Collector

This section describes an embodiment of the URL collector. The URL Collector obtains PRBs as inputs from an in-queue from the Page Request Feeder. Each PRB includes an HTTP response stream that was produced and sent by the web server in response to the HTTP request of the PRB. The URL Collector crawls through the HTTP response stream to gather new URIs to prefabricate. In an embodiment, the URL collector functions as a web crawler, and crawls through a response stream based upon the current prefabrication policy. The prefabrication policy determines which pages should be crawled by the URL collector. For example, the currentDepth parameter in the Policy object can be used to establish whether a particular page should be crawled.

In an embodiment, the URL collector executes as a single thread. For every relevant PRB in the URL collector's in-queue, it parses the response stream string buffer, looking for all the <href> references. For each relevant <href>, the URL collector constructs a PRB and sends it to the Benefit Analyzer. The Benefit Analyzer ensures no duplicate URIs are added to the PRB list.

The URL collector is configured to only crawl pages that have not already been crawled, or that has changed since the last time it was crawled. To accomplish this, the URL Collector checks whether the response stream buffer size is the same as last time it was crawled. A checksum or hashID routine can be executed to additionally determine if a page has sufficiently changed as to require being crawled. Any response streams forming an error page, e.g., which have compilation or other JSP exceptions, are not crawled.

Resource Manager

This section describes an embodiment of the resource manager usable in the invention. The resource manager monitors system resource usage, such as CPU and memory usage, on the machine where the prefabricator service is executing. The resource manager is also the component responsible for monitoring the load of the middle-tier system, by monitoring the number of concurrent requests of the Apache servers that the prefabricator service is interested in. This monitoring can be performed by sending URL requests to the mod-status Apache modules.

Based on the current system usage and predefined system resource limits, the resource manager provides information to other prefabricator components, such as the page request feeder, regarding whether the preset system resource limits have been exceeded, and how many page prefabrication requests that the prefabricator service can send to the Apache servers.

The Resource Manager uses the following system resource limits and information from the System Policy object, which in one embodiment, is stored in the database: (1) a list of all Apache servers and their port numbers in the middle-tier system; (2) whether a load balancer should be used, and if so, the host name and port number of the load balancer; (3) memory usage limit; (4) CPU usage limit; and, (5) maximum number of concurrent requests that the middle-tier system should be able to handle without significant impact on system response time.

The Resource Manager accesses the configuration information to determine which web server or load balancer the page prefabricator requests should be sent to. In an embodiment, if a load balancer is being used (e.g., for an n-node architecture), all page prefabrication requests should be sent to the load balancer. If no load balancer is available, page prefabrication requests are sent to the local web server, i.e., the web server residing on the same machine as the prefabricator service. If there are more than one web server running on such machine, an equal number of page prefabrication requests are sent to each web server.

The resource manager also determines the number of concurrent page prefabrication HTTP requests that the Page Request Feeder can send. In an embodiment, the following configured values are used in the calculation of the number of concurrent request that a prefabricator service instance should be sent to the web server:

Rmax is the maximum number of concurrent requests that the middle-tier system can handle without a significant degradation of response time W is the relative weight of the machine where the prefabricator service instance is running in.

Wtotal is the total relative weight of all configured machines.

If a load balancer is to be used, then the Resource Manager regularly monitors the number of concurrent requests on all the web servers configured (Rc1). In an embodiment, the number of requests (R) that this prefabricator service instance can send to the load balancer is:

$$R=(R\text{max}-Rc1)*(W/W\text{total})$$

If a load balancer is not used, and page prefabrication requests are to be sent to the local web server, then the Resource Manager regularly monitors the number of concurrent requests on the local web server(s) (Rc2). In an embodiment, the number of requests (R) that this prefabricator service instance can send to the load balancer is:

$$R=(R\text{max}*(W/W\text{total}))-Rc2$$

The resource manager also monitors the CPU and Memory usage on the local system. In an embodiment, a separate thread is spawned for CPU and memory usage measurements. The measurements are taken at predefined intervals, and the resource manager uses the measured usage number and the preset resource limits to determine whether the limits have been exceeded. The resource manager produces the following outputs: (1) current CPU usage on the local machine; (2) whether the CPU usage limit been exceeded; (3) current memory usage on the local machine; (4) whether the memory usage limit been exceeded; (5) the host name and port number of the web servers where page prefabrication HTTP requests should be sent to; and, (6) the number of concurrent page prefabrication HTTP requests that this page prefabricator service instance can send to the web server(s) or load balancer.

Resource Optimization

The goal of the prefabricator service is to optimally use the available system resources to prefabricate and regenerate pages. In one approach, the prefabrication and refresh rate should be as fast as, or faster than, the refresh interval configured for a given policy. The refresh interval configured by the administrator indicates the staleness of pages that are acceptable for the specific application.

By way of example, the following describes a resource optimization method for a system having one or more middle-tier machines that access a back-end server (e.g., a database server). The following factors are used in this embodiment to optimize resource utilization for the prefabrication process:

maximum percentage of system [middle-tier+prefab service] CPU that can be utilized ($CPU_{midtier}$)

maximum percentage of back-end server CPU that can be utilized ($CPU_{database}$)

average response time or PRB processing time ($T_{average}$)

As the above three parameters vary, the way in which the number of concurrent PRBs are processed also varies, as shown in the table below:

| $T_{average}$ | $CPU_{middle-tier}$ | $CPU_{database}$ | Reason | # of concurrent requests |
|---|---|---|---|---|
| Slow | high | Low | Jserv load is too high | Reduce |
| Slow | low/normal | High | DB is bottleneck | Reduce or nothing |
| Fast | high | Low | Jserv load is high | if $CPU_{middle\text{-}tier}$ > $CPU_{max}$ reduce |
| Fast | low/normal | High | DB is bottleneck | If $CPU_{database}$ > $CPU_{max}$ reduce |

Based on the above table, the number of concurrent requests can be increased from the prefabrication service to the web-server until the CPU utilization reaches the maximum level. Once this level is reached, the concurrency that provides a CPU utilization level less than the maximum response-time is chosen as the optimal concurrency. This optimal concurrency is re-calibrated periodically so as to tune to the changing system behavior.

An alternative approach uses a parameter setting that sets the maximum number of concurrent requests that can be handled by the web-server. This parameter setting can be provided, for example, by an authorized administrator. In this approach, the goal of the prefabricator system is not to use all the available resources, but instead to use the optimal amount of available resources to obtain the best refresh time per page. This approach uses the maximum number of concurrent requests that can be issued. The exact parameter setting for the maximum or optimal concurrency in the system is fundamental to this approach. The incoming traffic to the Jserv process should be carefully tuned to avoid overloading the user system with too many concurrent requests. An advantage of this approach is that it avoids making platform dependent system calls, distributed CPU measurements, and it can be used to specify the exact amount of CPU resource the prefabricator should use.

Security and Session Management

This section describes security management methods for prefabrication according to an embodiment of the invention. For the purposes of illustration, and not by way of limitation, the present explanation refers to a user connection as a "session" and to the identifier for the user connection as a "session ID". An identified user session may be formed, for example, when a user establishes an authorized connection to a database server to execute a database application. The session ID is used to validate a user session and to identify user preferences. In one approach to implementing sessions, a valid session ID is issued when a user successfully logs into an application. The session ID is checked for validity before the user is permitted to access pages within the application. The session ID remains valid until the user logs out.

As the user moves from page to page within the session, the session ID is passed along with the viewed pages by the server. The session ID is set as a cookie value when cookies are enabled, or as an URL parameter when cookies are disabled. In the present invention, since some pages accessed by a user are prefabricated while other are contemporaneously fabricated, there may be breaks in continuity between the pages handled by the server that are sent to the user, and thus the session IDs may not be fully passed from page to page. The present invention provides additional techniques to verify the validity of a session ID associated with a user session, even when prefabricated pages are returned to the user.

In one embodiment of the invention, the prefabricator is configured to avoid prefabricating the log-in page for a user. Thus, the user must proceed with normal log-in procedures to establish a valid user session. Upon successfully logging in, a session ID is assigned to the user session.

The first time the user requests a page from the interceptor, the validity of the session ID is verified through normal verification procedures, e.g., by passing the page request to the back-end database server. From that point on, the interceptor maintains a record of the validity of the session ID. If the user request a page that is not prefabricated, then the server dynamically services the page request and places the session ID on the page response. However, if the user requests a page that has been prefabricated, the interceptor returns the prefabricated page to the user - with the valid session ID includes as part of the page. Thus, the interceptor will itself make sure that the session ID is passed along in the page returned to the user, even if a prefabricated page is returned to the user. Because the valid session ID is always returned to the user in the response page, user sessions will not change during transitions when users move between prefabricated and non-prefabricated pages.

In an n-node environment, it is possible that within a single session, a user will send page requests to multiple server nodes. According to one embodiment, the interceptor module that first verifies the validity of a session ID will propagate that session ID to every other node in the system. A record of that session ID will be maintained at every node as being valid. When the user issues a page request, the router or load balancer will route that page request to one of the distributed nodes. Since the local interceptor at that node will presumably already recognize the validity of the session ID for the user, that local interceptor can immediately service the page request without further verifications. If the requested page has already been prefabricated, the page response with the attached session ID, can be immediately returned to the user.

In an embodiment of the invention, a cookie is employed to store information about the user's preferences, application the user is logged into and the responsibility the user has. The cookie may also contain other state information, such as the selected menu page. When cookies are disabled, this information is set as an URL parameter.

When a user logs in with a valid user name and password, a session identifier is generated for tracking the user session. This session identifier is contained in all subsequent requests of the user, until the time the user logs out voluntarily or the session times out. The session identifiers are captured at login time and stored in a shared-memory table (so all Apache processes have access to it). Subsequent requests that are serviced from Cache are sent back only after confirming that the session identifier is present in Shared memory. If the session identifier is not present in the shared-memory, session validation and default processing to the Jserv is performed. This ensures that an invalid session identifier cannot be used to access the system.

The following steps are performed to set-up a user session according to an embodiment of the invention:
a) The system authenticates the user using guest username and password;
b) A user session is created using the userID passed in by the prefabricator service;
c) The user's identity is switched to the userID passed as input. This sets the session as belonging to the relevant user; and,
d) Determine the session ID for this session.

The created sessionID is used by the Start Loader to construct the URI for the user. Since session creation and validation may be expensive, the session ID is shared by prefabricator requests belonging to multiple users. Therefore, when a prefabricator generated HTTP request is issued, the typical validation of sessionID process is bypassed. Instead, the cookie parameters are used to obtain the user's preference settings and to set up the user context correctly. This sets up both at the middle-tier and the connection-level context of the user.

If cookies are turned on, then the generated URI contains all URL parameters and cookie parameters according to an embodiment. In order to support smooth transition between prefabricated and non-prefabricated pages, the interceptor uses the actual user's sessionID in the URI and not the prefabricator generated sessionID. This ensures that, regardless of which page that is being accessed, the user is always in the context of the currently logged in session.

Interceptor

This section describes an embodiment of the interceptor. The interceptor stores prefabricated versions of dynamically generated JSP (JavaServer Pages) in its cache, and attempts to service real-user requests using these static cached versions of JSPs. The Interceptor over-rides the default behavior of the Apache WebServer's mod_serv module, by first attempting to service the user requests using pre-fabricated cached page responses. The user request is mapped to a prefabricated page filename and if an exact match is found in the cache, the prefabricated response is served back to the user. If no match is found, the default dynamic page generation process occurs and the page is sent back to the user.

The interceptor handles a page request differently depending upon whether the page request originates from the prefabricator or from the user. In an embodiment, a parameter is defined in the page request object that identifies the originator of the page request.

If a user sends a page request, then the interceptor performs the following steps to process the page request according to one embodiment:
1. Map the page request to unique identifier that can be used to look up prefabricated page, e.g., in the file system.
2. Check if the requested page exists in the cache. If the prefabricated page exists and was generated within the maximum permissible cache staleness and return the prefabricated page to the user.
3. If the requested page is not present in cache, perform default dynamic generation.
4. If the requested page is present in cache, but violates a maximum staleness requirement, dynamically generate the page and also refresh the Cached file with the dynamically generated page.
5. Return page response to user.

If the prefabricator sends the page request, then the interceptor performs the following steps to process the page request:
1. Dynamically generate the page.
2. Map the page request to unique identifier that can be used to look up prefabricated page.
3. Store the response in the cache under the static filename generated in step 2.
4. Return page response to prefabricator.

SYSTEM ARCHITECTURE OVERVIEW

Figure 13:
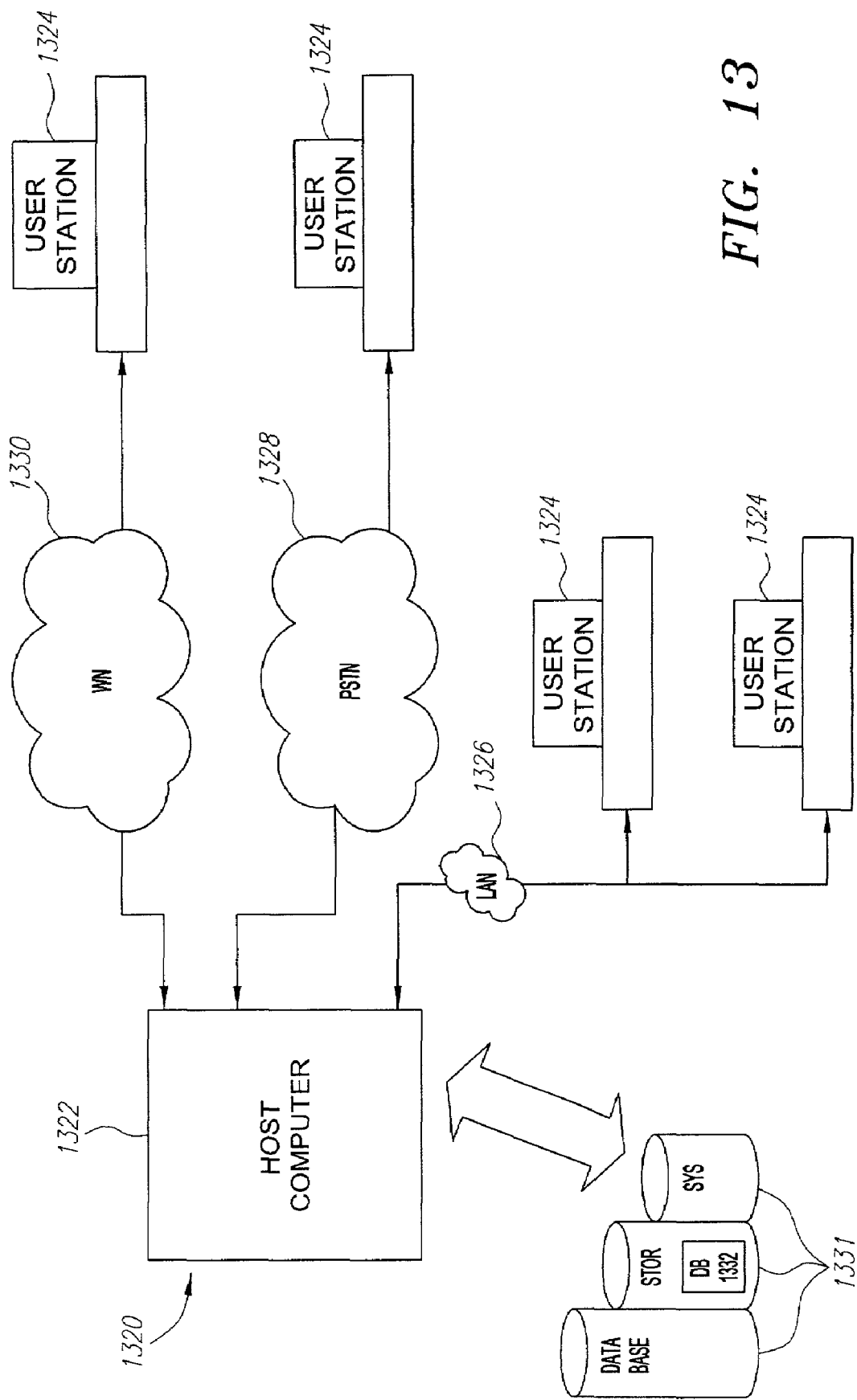
FIGS. 13 and 14 are diagrams of system architectures with which the present invention may be implemented.

Referring to FIG. 13, in an embodiment, a computer system 1320 includes a host computer 1322 connected to a plurality of individual user stations 1324. In an embodiment, the user stations 1324 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1324 are connected to the host computer 1322 via a local area network ("LAN") 1326. Other user stations 1324 are remotely connected to the host computer 1322 via a public telephone switched network ("PSTN") 1328 and/or a wireless network 1330.

In an embodiment, the host computer 1322 operates in conjunction with a data storage system 1331, wherein the data storage system 1331 contains a database 1332 that is readily accessible by the host computer 1322. Note that a multiple tier architecture can be employed to connect user stations 1324 to a database 1332, utilizing for example, a middle application tier (not shown). In alternative embodiments, the database 1332 may be resident on the host computer, stored, e.g., in the host computer's ROM, PROM, EPROM, or any other memory chip, and/or its hard disk. In yet alternative embodiments, the database 1332 may be read by the host computer 1322 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 1322 can access two or more databases 1332, stored in a variety of mediums, as previously discussed.

Figure 14:
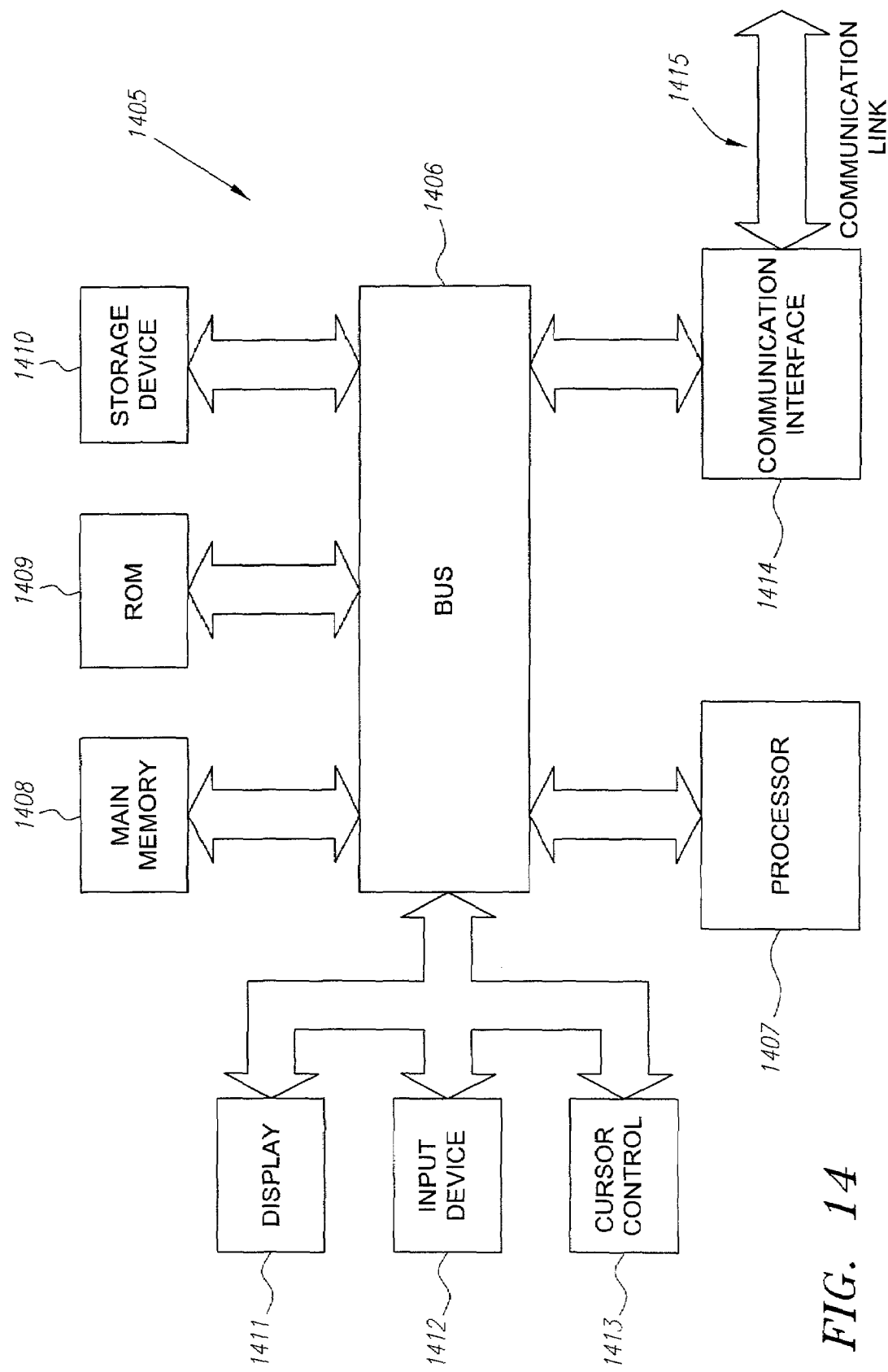

Referring to FIG. 14, in an embodiment, each user station 1324 and the host computer 1322, each referred to generally as a processing unit, embodies a general architecture 1405. A processing unit includes a bus 1406 or other communication mechanism for communicating instructions, messages and data, collectively, information, and one or more processors 1407 coupled with the bus 1406 for processing information. A processing unit also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. A processing unit may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A processing unit may be coupled via the bus 1406 to a display device 1411, such as, but not limited to, a cathode ray tube (CRT), for displaying information to a user. An input device 1412, including alphanumeric and other columns, is coupled to the bus 1406 for communicating information and command selections to the processor(s) 1407. Another type of user input device may include a cursor control 1413, such as, but not limited to, a mouse, a trackball, a fingerpad, or cursor direction columns, for communicating direction information and command selections to the processor(s) 1407 and for controlling cursor movement on the display 1411.

According to one embodiment of the invention, the individual processing units perform specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409. Volatile media, i.e., media that can not retain information in the absence of power, includes the main memory 1408. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1407 can retrieve information. Various forms of computer-usable media may be involved in providing one or more sequences of one or more instructions to the processor(s) 1407 for execution. The instructions received by the main memory 1408 may optionally be stored on the storage device 1410, either before or after their execution by the processor(s) 1407.

Each processing unit may also include a communication interface 1414 coupled to the bus 1406. The communication interface 1414 provides two-way communication between the respective user stations 1424 and the host computer 1422. The communication interface 1414 of a respective processing unit transmits and receives electrical, electromagnetic or optical signals that include data streams representing various types of information, including instructions, messages and data. A communication link 1415 links a respective user station 1424 and a host computer 1422. The communication link 1415 may be a LAN 1326, in which case the communication interface 1414 may be a LAN card. Alternatively, the communication link 1415 may be a PSTN 1328, in which case the communication interface 1414 may be an integrated services digital network (ISDN) card or a modem. Also, as a further alternative, the communication link 1415 may be a wireless network 1330. A processing unit may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for prefabricating an information page, comprising:
   prefabricating a first page in accordance with a definable prefabrication policy to produce a first prefabricated page, wherein the prefabricating is not in response to an information request for the first page by a user;
   receiving the information request;
   determining if the information request corresponds to the first page;
   providing the first prefabricated page if the information request corresponds to the first page;
   dynamically fabricating a second page if the information request corresponds to the second page,
   wherein the act of prefabricating the first page comprises sending a request for information of the first page, wherein the request comprises a page request block (PRB) and is transmitted at a rate based on system resource information; and
   storing the first page prefabricated in accordance with the definable prefabrication policy in a computer readable medium or a storage device.

2. The method of claim 1 further comprising:
   determining if the first prefabricated page is stale;
   dynamically fabricating the first page if the first prefabricated page is stale.

3. The method of claim 2 in which a time factor is considered in determining whether the first prefabricated page is stale.

4. The method of claim 1 further comprising:
   crawling the first prefabricated page;
   determining if additional pages should be prefabricated; and
   prefabricating the additional pages.

5. The method of claim 4 in which the first page is a start page.

6. The method of claim 1 in which prefabricating the first page comprises:
   querying a database for information;
   processing the information; and
   packaging the processed information into the first prefabricated page.

7. The method of claim 1 in which a system resource level is considered before scheduling the action of prefabricating the first page.

8. The method of claim 7 in which the system resource level is a resource measure selected from the group consisting of: CPU usage level, memory usage level, and number of pending prefabrication requests.

9. The method of claim 1 in which the definable prefabrication policy applies to a specific user or class of users.

10. The method of claim 1 in which the definable prefabrication policy identifies pages to prefabricate.

11. The method of claim 10 in which the definable prefabrication policy comprises a responsibility parameter.

12. The method of claim 10 in which the definable prefabrication policy comprises an application identifier.

13. The method of claim 10 in which the definable prefabrication policy comprises a scheduling parameter.

14. The method of claim 10 in which the definable prefabrication policy comprises a refresh rate parameter.

15. The method of claim 1 in which auto-tuning of the prefabricating step is performed to minimize interference with other system workload.

16. The method of claim 1 in which the definable prefabrication policy is organized as a hierarchy of policies.

17. The method of claim 16 in which the definable prefabrication policy comprises a system policy.

18. The method of claim 16 in which the definable prefabrication policy comprises an application policy.

19. The method of claim 16 in which the definable prefabrication policy comprises a user policy.

20. The method of claim 1, wherein the PRB identifies at least one of a depth level, a prioritization weight, and an average page generation time.

21. The method of claim 1 in which the first page comprises a browser page.

22. The method of claim 1 in which the first prefabricated page is cached.

23. A system, comprising a processor, for prefabricating information, comprising:

a prefabricator configured to prefabricate a first page to produce a first prefabricated page, wherein the first page is not prefabricated by the prefabricator in response to an information request for the first page by a user, and wherein the act of prefabricating the first page comprises sending a request for information of the first page, wherein the request comprises a page request block (PRB) and is transmitted at a rate based on system resource information; and an interceptor to intercept the information request, the interceptor logically interposed between a user interface and a computer application, the interceptor providing the first prefabricated page if the information request corresponds to the first page and dynamically fabricating a second page if the information request corresponds to the second page.

24. The system of claim 23 in which the prefabricator comprises a module to identify pages to prefabricate.

25. The system of claim 23 in which the prefabricator comprises a module to prioritize a list of pages to prefabricate.

26. The system of claim 25 in which the module prioritizes the list of pages based upon a system resource parameter.

27. The system of claim 25 in which the module prioritizes the list of pages based upon a page prefabrication time parameter.

28. The system of claim 25 in which the module prioritizes the list of pages based upon a user access pattern parameter.

29. The system of claim 25 in which the module prioritizes the list of pages based upon a page depth parameter.

30. The system of claim 23 in which the first page corresponds to a page request, wherein the page request is processed as a second information request to the interceptor.

31. The system of claim 30 in which the prefabricator comprises a module to determine a number of page requests to concurrently process into prefabricated pages.

32. The system of claim 31 in which the number of concurrent page requests increase when available system resources increase.

33. The system of claim 23 in which the prefabricator comprises a module to crawl the first prefabricated page for additional pages to prefabricate.

34. The system of claim 23 in which the prefabricator accesses a prefabrication policy to manage prefabricating the first page.

35. The system of claim 23 in which the user interface comprises a browser.

36. The system of claim 23 in which the computer application comprises a database application.

37. The system of claim 23 in which the interceptor is integrated into a web server.

38. The system of claim 23 in which the interceptor is integrated with a cache server.

39. The system of claim 23 in which the prefabricator comprises a module to monitor system resources.

40. The system of claim 23 in which the prefabricator and the interceptor are logically associated with a first network node, wherein the system further comprises:

a second prefabricator and a second interceptor logically associated with a second network node.

41. The system of claim 40 in which the routing component routes information requests among the first and second network nodes.

42. The system of claim 40 in which a load distributor distributes a prefabrication workload among the first and second network nodes.

43. The system of claim 42 in which the prefabrication workload is distributed based upon system resource levels at the first and second network nodes.

44. The system of claim 43 in which a node is assigned a share of the prefabrication workload based on a resource level of the node.

45. The system of claim 43 in which each of the first and second network nodes are assigned work from the prefabrication workload based upon its individual resource levels without regard to resource levels on other nodes.

46. The system of claim 43 in which the first and second network nodes are assigned work from the prefabricated workload in a coordinated manner.

47. The system of claim 40 in which prefabricated pages are stored in a network accessible storage device.

48. The system of claim 23 which is non-intrusively implemented with an existing computer application such that code changes are not performed against the existing computer application.

49. The system of claim 23, wherein the PRB identifies at least one of a depth level, a prioritization weight, and an average page generation time.

50. A method for prefabricating information pages, comprising:

prefabricating a first page on a first node to produce a first prefabricated page, wherein the prefabricating is not in response to an information request for the first page by a user;

storing the first prefabricated page in a first computer readable storage medium or a first storage device;

prefabricating a second page on a second node to produce a second prefabricated page;

storing the second prefabricated page in the first computer readable storage medium, the first storage device, a second computer readable storage medium, or a second storage device;

receiving the information request;

providing the first prefabricated page if the information request corresponds to the first page; and providing the second prefabricated page if the information request corresponds to the second page, wherein the act of prefabricating the first page comprises sending a request for information of the first page, wherein the request comprises a page request block (PRB) and is transmitted at a rate based on system resource information.

51. The method of claim 50 further comprising:

routing the information request to either the first or second node.

52. The method of claim 50 in which the first node accesses the second prefabricated page to satisfy the information request.

53. The method of claim 50 in which the first and second prefabricated pages are stored on a network accessible storage device.

54. The method of claim 53 in which network accessible storage device comprises a NFS-compliant device.

55. The method of claim 50 in which a prefabrication workload is distributed among the first and second nodes.

56. The method of claim 55 in which a node is assigned a share of the prefabrication workload based on a resource level of the node.

57. The method of claim 55 in which each of the first and second nodes are assigned work from the prefabrication workload based upon its individual resource levels without regard to resource levels on other nodes.

58. The method of claim 55 in which the first and second nodes are assigned work from the prefabricated workload in a coordinated manner.

59. A method for prefabricating an information page, comprising:
prefabricating a first page to produce a first prefabricated page, wherein the prefabricating is not in response to an information request for the first page by a user;
receiving the information request from a user having a session identifier;
determining if the information request corresponds to the first page;
providing the first prefabricated page with the session identifier if the information request corresponds to the first page;
dynamically fabricating a second page if the information request corresponds to the second page,
wherein the act of prefabricating the first page comprises sending a request for information of the first page, wherein the request comprises a page request block (PRB) and is transmitted at a rate based on system resource information; and
storing the first prefabricated page in a computer readable storage medium or a storage device.

60. The method of claim 59 further comprising:
verifying validity of the session identifier.

61. The method of claim 60 further comprising:
distributing a message verifying the validity of the session identifier to one or more network nodes.

62. The method of claim 59 in which the session identifier is provided with the first prefabricated page as a URL parameter.

63. The method of claim 59 in which the session identifier is provided with the first prefabricated page as a cookie value.

64. A method for prefabricating an information page comprising:
obtaining one or more parameters that define how a page should be prefabricated;
prefabricating a page based on the one or more parameters, wherein the prefabricating is not in response to an information request for the page by a user, and wherein the act of prefabricating the page comprises sending a request for information of the first page, wherein the request comprises a page request block (PRB) and is transmitted at a rate based on system resource information; and
storing the page prefabricated based on the one or more parameters in a computer readable storage medium or a storage device.

65. The method of claim 64, wherein one of the one or more parameters is based on a specific user or class of users.

66. The method of claim 64, further comprising identifying a page to prefabricate based on the one or more parameters.

67. The method of claim 64, further comprising identifying an application for which the page should be prefabricated based on the one or more parameters.

68. The method of claim 64, wherein one of the one or more parameters comprises a scheduling parameter.

69. The method of claim 64, wherein one of the one or more parameters comprises a refresh rate parameter.

70. The method of claim 64, wherein the one or more parameters are organized as a hierarchy of policy categories.

71. A computer program product that includes a medium usable by a processor, the medium having stored thereon a sequence of instructions which, when executed by said processor, causes said processor to execute a process for prefabricating an information page, the process comprising:
prefabricating a first page in accordance with a definable prefabrication policy to produce a first prefabricated page, wherein the prefabricating is not in response to an information request for the first page by a user;
receiving the information request;
determining if the information request corresponds to the first page;
providing the first prefabricated page if the information request corresponds to the first page; and
dynamically fabricating a second page if the information request corresponds to the second page,
wherein the act of prefabricating the first page comprises sending a request for information of the first page, wherein the request comprises a page request block (PRB) and is transmitted at a rate based on system resource information.

72. A computer program product that includes a medium usable by a processor, the medium having stored thereon a sequence of instructions which, when executed by said processor, causes said processor to execute a process for prefabricating an information page, the process comprising:
prefabricating a first page on a first node to produce a first prefabricated page, wherein the prefabricating is not in response to an information request for the first page by a user;
storing the first prefabricated page;
prefabricating a second page on a second node to produce a second prefabricated page;
storing the second prefabricated page;
receiving the information request;
providing the first prefabricated page if the information request corresponds to the first page; and
providing the second prefabricated page if the information request corresponds to the second page,
wherein the act of prefabricating the first page comprises sending a request for information of the first page, wherein the request comprises a page request block (PRB) and is transmitted at a rate based on system resource information.

73. The computer program product of claim 71, the process further comprising:
determining if the first prefabricated page is stale;
dynamically fabricating the first page if the first prefabricated page is stale.

74. The computer program product of claim 71, the process further comprising:
crawling the first prefabricated page;
determining if additional pages should be prefabricated; and
prefabricating the additional pages.

75. The computer program product of claim 71 in which the prefabricating the first page comprises:
querying a database for information;
processing the information; and
packaging the processed information into the first prefabricated page.

76. The computer program product of claim 71 in which the process further comprises considering a system resource level before scheduling the action of prefabricating the first page.

77. The computer program product of claim 71 in which the definable prefabrication policy applies to a specific user or class of users.

78. The computer program product of claim 71 in which the definable prefabrication policy identifies pages to prefabricate.

79. The computer program product of claim 71 in which the step of prefabricating comprises performing auto-tuning to minimize interference with other system workload.

80. The computer program product of claim 71 in which the definable prefabrication policy is organized as a hierarchy of policies.

81. The computer program product of claim 71 in which the first page comprises a browser page.

82. The computer program product of claim 71 in which the process further comprises caching the first prefabricated page.

83. The computer program product of claim 71, wherein the prefabricating is performed in response to a request initiated by a software, a hardware, or a combination of both.

84. The computer program product of claim 72, the process further comprising:
   routing the information request to either the first or second node.

85. The computer program product of claim 72 in which the process further comprises causing the first node to access the second prefabricated page to satisfy the information request.

86. The computer program product of claim 72 in which the process further comprises storing the first and second prefabricated pages on a network accessible storage device.

87. The computer program product of claim 72 in which the process further comprises distributing a prefabrication workload among the first and second nodes.

88. The computer program product of claim 72, wherein the prefabricating is performed in response to a request initiated by a software, a hardware, or a combination of both.

89. The method of claim 1, wherein the prefabricating is performed in response to a request initiated by a software, a hardware, or a combination of both.

90. The method of claim 50, wherein the prefabricating is performed in response to a request initiated by a software, a hardware, or a combination of both.

91. The method of claim 59, wherein the prefabricating is performed in response to a request initiated by a software, a hardware, or a combination of both.

92. The method of claim 64, wherein the prefabricating is performed in response to a request initiated by a software, a hardware, or a combination of both.

* * * * *

UNITED STATES PATENT AND TRADEMARK OFFICE
CERTIFICATE OF CORRECTION

| | | |
|---|---|---|
| PATENT NO. | : 7,584,418 B2 | Page 1 of 1 |
| APPLICATION NO. | : 09/872589 | |
| DATED | : September 1, 2009 | |
| INVENTOR(S) | : Sowmya Subramanian et al. | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 344 days.

Delete the phrase "by 344 days" and insert -- by 619 days --.

In the drawings:
On sheet 7 of 13, in Figure 7, Ref. Numeral 706, line 1, delete "RESOURSEMANAGER" and insert -- RESOURSE MANAGER --, therefor.

In column 12, line 28, delete "applicationID):" and insert -- applicationID: --, therefor.

In column 15, line 20, delete "URLCollector" and insert -- URL collector --, therefor.

In column 16, line 45, delete "webserver," and insert -- web server, --, therefor.

In column 17, line 58, delete "time" and insert -- time. --, therefor.

In column 21, line 7, delete "mod_serv" and insert -- mod_jserv --, therefor.

Signed and Sealed this

Seventeenth Day of August, 2010

David J. Kappos
*Director of the United States Patent and Trademark Office*